United States Patent
Miller et al.

(10) Patent No.: US 7,212,799 B2
(45) Date of Patent: May 1, 2007

(54) METHOD AND APPARATUS FOR ACQUIRING AND TRACKING ULTRAWIDE BANDWIDTH SIGNALS

(75) Inventors: Timothy R. Miller, Arlington, VA (US); John W. McCorkle, Vienna, VA (US); Adrian R. Macias, Arlington, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 620 days.

(21) Appl. No.: 10/654,922

(22) Filed: Sep. 5, 2003

(65) Prior Publication Data

US 2004/0048595 A1 Mar. 11, 2004

Related U.S. Application Data

(60) Provisional application No. 60/407,960, filed on Sep. 5, 2002.

(51) Int. Cl.
*H04B 1/06* (2006.01)
(52) U.S. Cl. .................. 455/260; 455/502; 375/362
(58) Field of Classification Search ............ 455/502, 455/75, 260, 265; 375/362–369, 375; 370/350
See application file for complete search history.

(56) References Cited

U.S. PATENT DOCUMENTS 6,658,242 B1 * 12/2003 Knutson et al. ......... 455/232.1
2003/0165134 A1 * 9/2003 Low et al. ................. 370/350

* cited by examiner

Primary Examiner—Lee Nguyen

(57) ABSTRACT

A method is provided for fast acquisition in a wireless network. This method involves receiving a first wireless signal at a receiving device, sent from a transmitting device; determining a first transmitting clock phase of the transmitting device by performing first acquisition and tracking processes on the first wireless signal; storing the first transmitting clock phase in the receiving device; receiving a second wireless signal at a receiving device, sent from the transmitting device after the first wireless signal; and determining a second transmitting clock phase of the transmitting device by performing a second acquisition process on the second wireless signal using the first transmitting clock phase as starting phase data. By using the stored first transmitting clock phase information as a starting point for acquisition, the receiving device can perform a second acquisition process that is much faster than a blind acquisition.

20 Claims, 15 Drawing Sheets

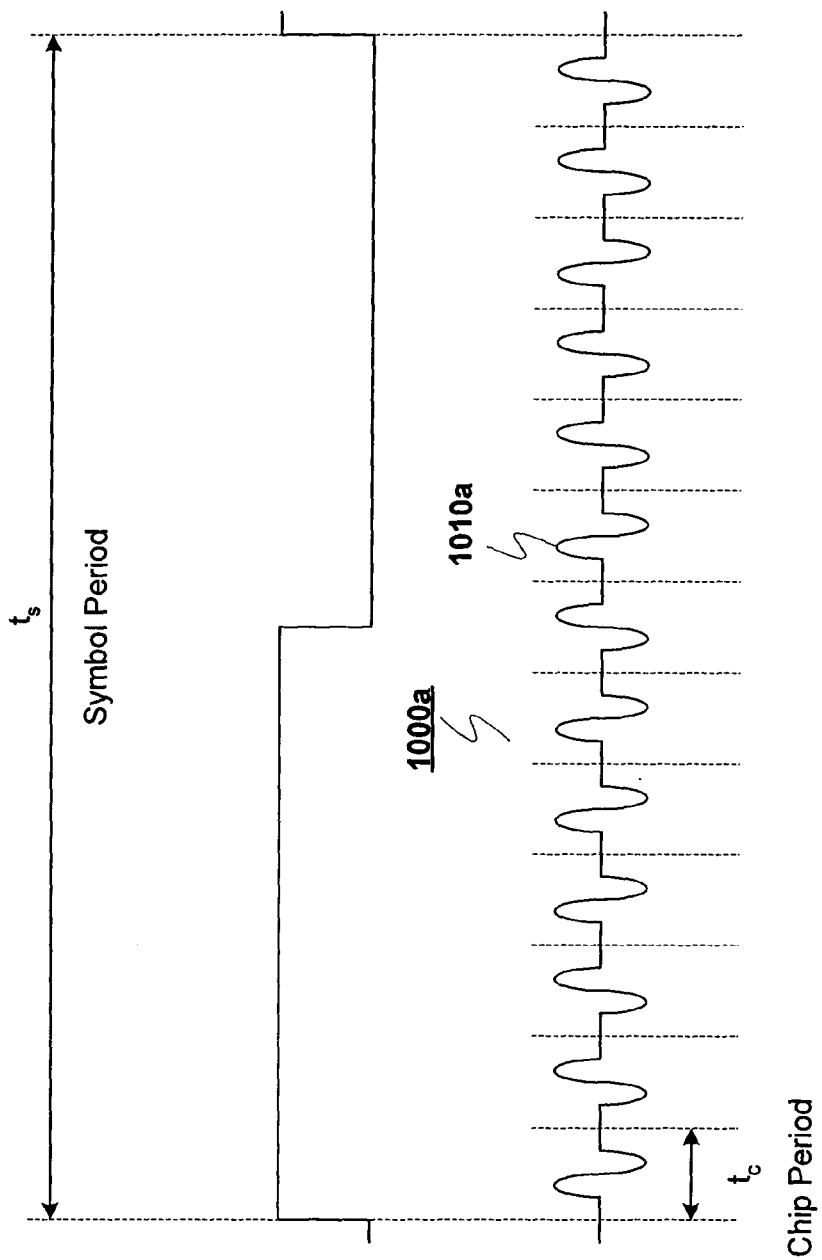

METHOD AND APPARATUS FOR ACQUIRING AND TRACKING ULTRAWIDE BANDWIDTH SIGNALS

CROSS-REFERENCE TO RELATED PATENT DOCUMENTS

This application relies for priority on U.S. provisional application Ser. No. 60/407,960, by Adrian R. Macias, filed Sep. 5, 2002, entitled "METHOD OF ACQUIRING AN ULTRAWIDE BANDWIDTH SIGNAL," the contents of which are hereby incorporated by reference in their entirety.

BACKGROUND OF THE INVENTION

In wireless communications it is necessary for two devices to initially establish a communications link and then to maintain that link over time. These processes are generally called acquisition and tracking, respectively. What follows is a quick background into the concept of acquisition and tracking between two radios, more specifically regarding the acquisition portion of that process.

The terms radio, transceiver, and device are used freely throughout the disclosure to refer to an element that transmits and receives wireless signals such as ultrawide bandwidth (UWB) signals. They are not meant to be limiting, but are used for ease of description.

FIG. 1 is a block diagram of a wireless transmitter and receiver according to preferred embodiments of the present invention. As shown in FIG. 1, two radios 110 and 120 are provided that would like to talk to each other. In this description the first radio 110 will begin as a transmitter, and the second radio 120 will operate as a receiver.

In this embodiment the two radios 110 and 120 will communicate using packets. Alternate embodiments could use a different mechanism for passing data as desired. During communications, the first radio 110 will send a series data packets to the second radio 120 one after another, but not necessarily continuously. As a result, there will be a time when the first radio 110 is not transmitting and the two radios 110 and 120 are not in active communication with each other.

However, in order for the two radios 110 and 120 to talk to each other, they have to have each acquired the signal of the other. In this particular embodiment, acquisition is achieved by having the two radios synchronize their fundamental crystals, i.e., the fundamental clock that their radio runs off of. Generally this is accomplished by having the receiver 120 adjust a local clock to the phase of the clock used by the transmitter 110 to transmit signals.

Synchronization problems can arise from slight differences in the two radios 110 and 120, however. First, it is possible that the two radios 110 and 120 may not be operating at the same frequency. In this case it will be necessary to adjust the effective frequency of one of the radios to operate at the same frequency as the other radio. The amount of allowable frequency adjustment will depend on the accuracy of the crystals used in the device. Preferably crystals with an accuracy of 25 parts per million (ppm) are used, though other sorts of crystals can be used in alternate embodiments (e.g., crystals with an accuracy of 50 ppm). In the preferred embodiment the accuracy of frequency adjustment is about +/−3 MHz, although this may be varied in alternate embodiments. For the sake of the examples provided below, however, it will be assumed that both radios 110 and 120 operate at the same effective frequency.

Second, the two radios 110 and 120 may not necessarily be operating at the same phase. In other words, rather than operating in lock step with regard to phase, each may be operating at a different phase with respect to the other. In this case it will be necessary to adjust the phase of one of the radios so that it conforms with the phase of the other radio.

Third, although the effective frequencies of the two radios 110 and 120 may be the same, because of slight variations in manufacture, their actual frequencies may vary by a slight amount. For example, if the two radios 110 and 120 are both operating at an effective frequency of 100 MHz, the actual frequencies may be a fraction of a percent off from this effective frequency. Thus, the transmitter 110 might actually be transmitting at a frequency of 99.99 MHz, while the receiver 120 might operate at a frequency of 100.01 MHz. Overtime this could cause a slippage of phase between the two radios 110 and 120.

Therefore, it is desirable to provide a method of acquisition between wireless devices that is both fast and accurate.

SUMMARY OF THE INVENTION

Consistent with the title of this section, only a brief description of selected features of the present invention is now presented. A more complete description of the present invention is the subject of this entire document.

An object of the present invention is to provide a method of fast acquisition that will enable a wireless network to reduce the amount of time needed for devices to synchronize their clocks when they start communications.

Another object of the present invention is to provide a fast acquisition circuit that will enable such a fast acquisition process.

These and other objects are accomplished by way of a method of fast acquisition in a wireless network, comprising: receiving a first wireless signal at a receiving device, the first wireless signal being sent from a transmitting device; determining a first transmitting clock phase of the transmitting device by performing first acquisition and tracking processes on the first wireless signal; storing the first transmitting clock phase in the receiving device; receiving a second wireless signal at a receiving device, the second wireless signal being sent from the transmitting device after the first wireless signal; determining a second transmitting clock phase of the transmitting device by performing a second acquisition process on the second wireless signal, wherein the second acquisition process is performed using the first transmitting clock phase as starting phase data.

The step of determining the first transmitting clock phase may include determining how a receiving clock phase must be altered to match the first transmitting clock phase; and the step of determining the second transmitting clock phase may include determining how the receiving clock phase must be altered to match the second transmitting clock phase.

This method of fast acquisition may further comprise updating the stored first transmitting clock phase during a coast period between when the first tracking process ends and the second acquisition process begins.

The step of determining the first transmitting clock phase may further comprise: calculating the first transmitting clock phase of the transmitting device by performing the first acquisition process; and updating the first transmitting clock phase of the transmitting device by performing the first tracking process, wherein the step of storing the first transmitting clock phase stores the updated first transmitting clock phase at the end of the first tracking process.

The step of updating the first transmitting clock phase may further comprise: measuring an instantaneous frequency of the first wireless signal; and adjusting the first transmitting clock phase based on a difference between the instantaneous frequency of the first wireless signal and a frequency of a local receiver clock.

The method of fast acquisition may further comprise: determining a frequency average value of the first wireless signal when the first tracking process ends; and storing the frequency average value.

The method of fast acquisition may further comprise updating the first transmitting clock phase during a coast period between when the first tracking process ends and the second acquisition process begins.

The step of updating the first transmitting clock may further comprise adjusting the stored first transmitting clock phase based on a difference between the frequency average value and the frequency of a local receiver clock.

The first acquisition process may be a blind acquisition process.

The first and second wireless signals may be ultrawide bandwidth signals.

BRIEF DESCRIPTION OF THE DRAWINGS

A more complete appreciation of the invention and its many attendant advantages will be readily obtained as it becomes better understood with reference to the following detailed description when considered in connection with the accompanying drawings, in which:

FIGS. 10A and 10B are timing diagrams of symbols that have thirteen chips, according to preferred embodiments of the present invention;

DETAILED DESCRIPTION OF THE PREFERRED EMBODIMENTS

Figure 1:
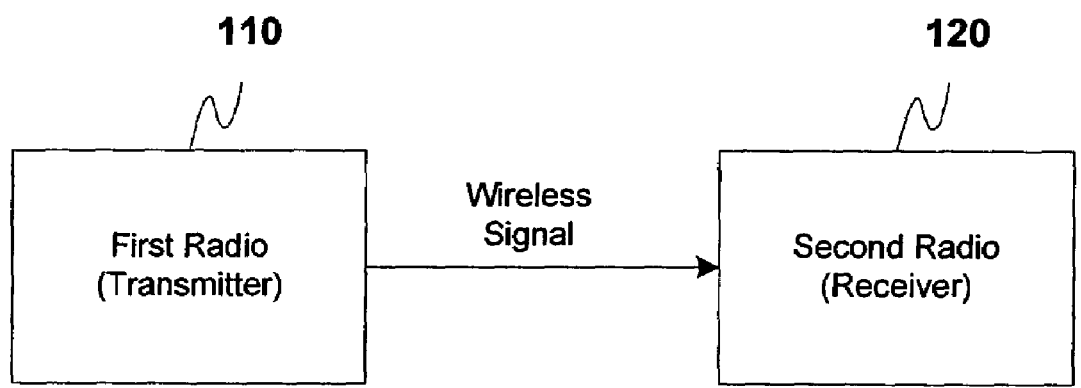
FIG. 1 is a block diagram of a wireless transmitter and receiver according to preferred embodiments of the present invention.

Preferred embodiments of the present invention will now be described with reference to the drawings. Throughout the several views, like reference numerals designate identical or corresponding parts.

Synchronization of a Receiver to a Transmitter

As noted above, it is often necessary to synchronize the clocks in two wireless radios 110 and 120 in phase and frequency. One way to accomplish this is for the receiving radio 120 to listen to a known signal being transmitted by the transmitting radio 110, and to move the receiving clock position around until it finds a strong correlation peak between the known incoming signal and a locally generated signal. Once this happens the receiving radio 120 will analyze the incoming signal to determine whether it contains valid data or not. If the data is valid, then acquisition is successful. If the data is not valid, the receiver 120 will continue varying the phase of its clock until it finds a signal with valid data.

Consider an example of a transmitter and using a 10-nanosecond clock period, which correlates to a 100 MHz clock speed. In this example, within each successive clock period the receiver 120 will shift its phase by one phase step such that the leading edge of the locally generated clock pulse will travel through all of the possible phase locations that the chosen phase step will allow. As the phase of the locally generated signal changes, it will eventually match up with the phase of the transmitted signal, and the clock phase of the receiving radio 120 will synchronize up with the clock phase of the transmitting radio 110.

Figure 2:
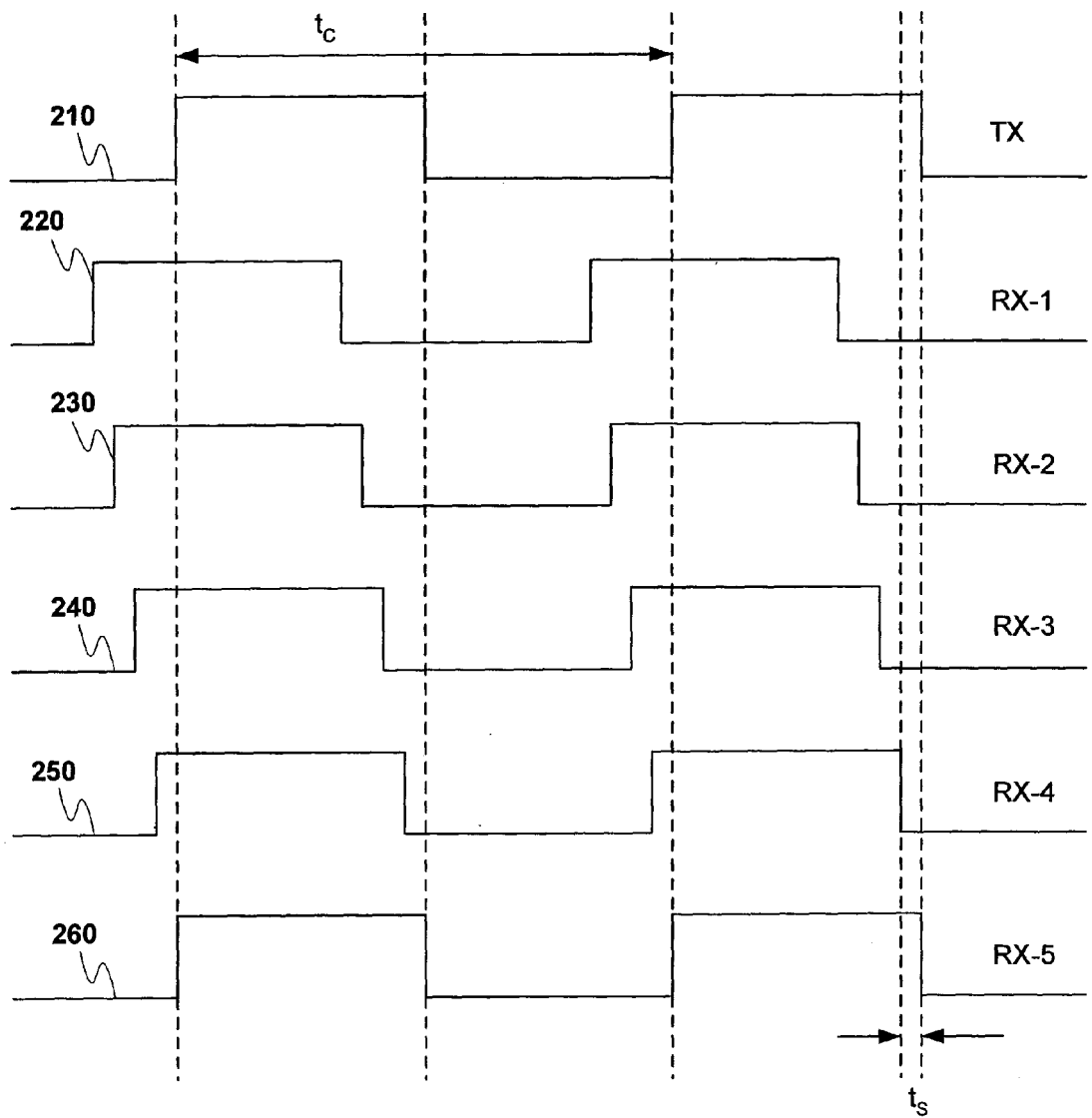
FIG. 2 is a timing diagram showing the phases of a transmitter clock and a receiver clock during acquisition, according to preferred embodiments of the present invention.
Figure 3:
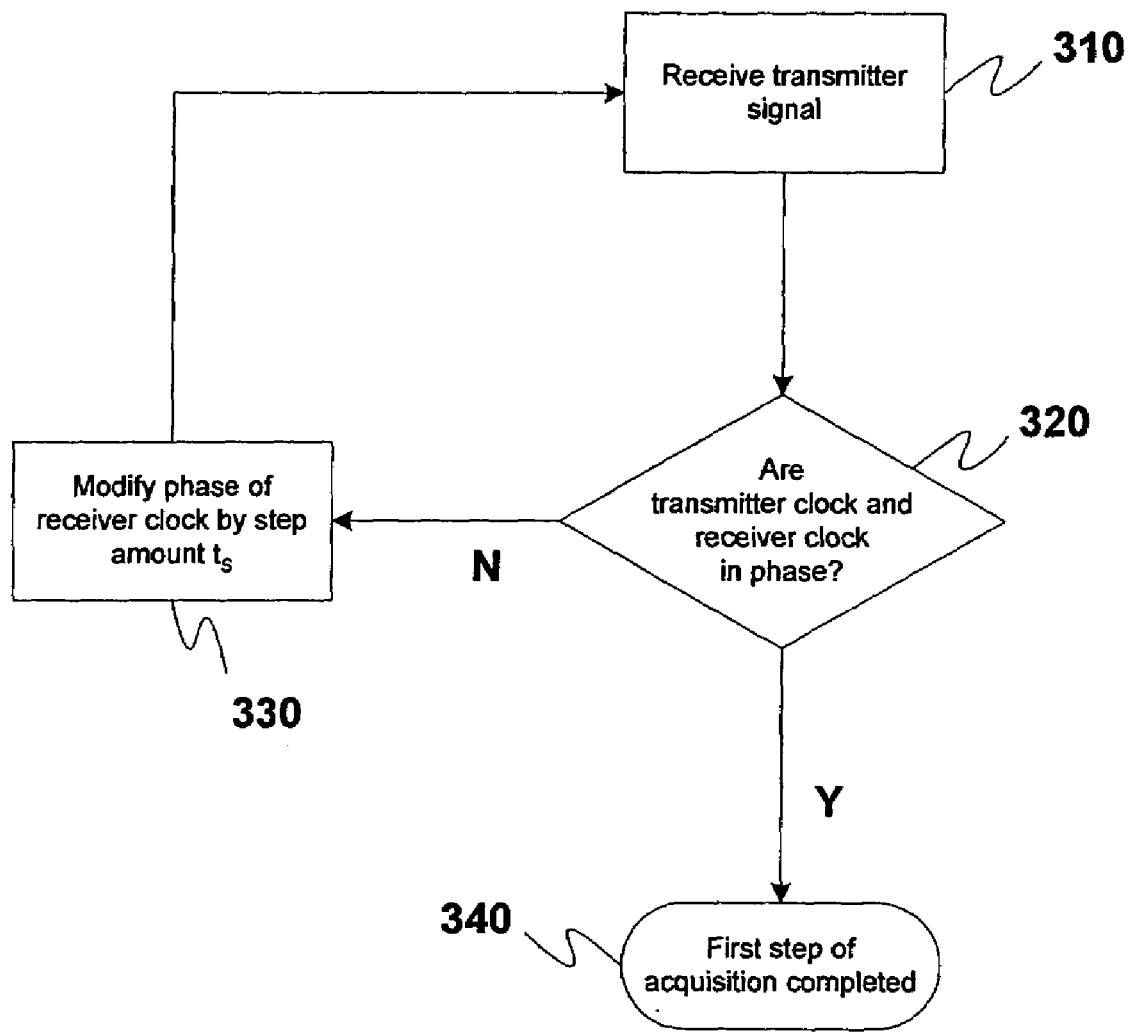
FIG. 3 is a flow chart showing the steps of acquisition according to preferred embodiments of the present invention.

This can be seen, for example, in FIGS. 2 and 3, which show the phases of the transmitter clock and the receiver clock, and the steps of acquisition, respectively, according to preferred embodiments of the present invention. As shown in FIG. 2, the clock in the transmitter 110 (TX) is operating at a given phase, with a clock period of $t_C$. For the purposes of this example, we will assume the clock in the receiver 120 (RX) is also operating with a clock period of $t_C$ before reception of the transmitter's signal at the receiver, but at a different phase. The frequency of the receiver will usually not be exactly the same as that of the transmitter. However, they should be close enough to make this analysis approximately correct.

As shown in FIG. 3, the receiver 120 starts by receiving the signal 210 sent from the transmitter 110. (Step 310) The receiver 120 then determines through an analysis of the transmitter's signal whether the transmitter clock signal 210 and the starting receiver clock signal 220 are in phase. (Step 320) If they are not in phase, then the receiver 120 modifies the phase of the receiver clock by a step amount of time $t_S$ (Step 330), and returns to Step 310. If the two clock signals are in phase, then the first step of acquisition is successful, and that first step of acquisition is completed. (Step 340)

In alternate embodiments the receiver 120 can have multiple arms (also called fingers) step through phase in various directions and at various step sizes. For example, one embodiment could have two arms, one increasing the receiver clock phase by the step amount $t_S$, the other decreasing the receiver clock phase by the same amount $t_S$. In this way the receiver could quickly investigate the phases around the starting phase. Other alternate embodiments could use more arms. For example, an embodiment could have four arms, one incrementing phase by an amount $t_S$, one incrementing phase by an amount $2t_S$, one decrementing phase by an amount $t_S$, and one decrementing phase by an amount $2t_S$. Numerous variations are possible.

FIG. 2 shows the case where four steps are required to get the receiver clock in step with the transmitter clock. As shown in this example, the starting clock signal 220 is advanced by the step amount $t_S$ four times to obtain the second through fourth clock signals, respectively 230, 240, 250, and 260. Once the receiver clock signal (in this case the fifth receiver clock signal 260) is in phase with the transmitter clock signal 210, the receiver 120 can stop advancing the phase of the receiver clock.

Obviously different numbers of steps can be used as necessary. Preferably the step size $t_S$ is chosen to allow for an effective process of matching phases. Furthermore, even if an exact match of phase is not possible, the receiver will stop when the receiver's phase is a close enough match of the phase of the transmitter. This can be accomplished by calculating the correlation between the received signal and the locally generated signal and looking for values above a threshold value. How close the phases must be for successful acquisition depends upon the threshold chosen.

One problem with conventional acquisition processes is that they often take a long time to match phases between the transmitter 110 and the receiver 120. If the receiver 120 uses large step sizes $t_S$ and moves through the clock period quickly, it might miss the phase it's searching for. As a result, it's necessary to take smaller steps $t_S$ to make sure that the whole period is sampled very finely. And that takes a long time.

Retaining a Memory of Acquisition Information

One way to avoid this problem is to retain a memory in each receiving device of past acquisitions to speed up future acquisitions. For example, once a receiver 120 first synchronizes its clock with that of the transmitter 110, it can remember some of the relevant phase information for later acquisition processes. The receiver 120 can then use that information to start a later acquisition in a more likely correct position. And while the information about a prior acquisition may not be exactly right, it's more likely to be better for fast acquisition than a random start position.

In addition, because the system in each receiver 120 remembers the transmitter clock phase as it was for the previous acquisition, knows some information about the frequency used by the transmitter 110, and knows the duration since the last known transmitter clock phase, it can extrapolate to an expected current phase for the transmitter clock, and start the acquisition at that phase. In practice, this serves as a very good start position.

Furthermore, if the receiver 120 has two or more arms (or fingers as they are also called), it can step through possible phases in either direction from this starting phase. Using this scheme, the receiver 120 can start at the estimated current phase and slowly scan away from that in both directions. This generally takes a lot less time than starting in a random location and slowly scanning away from that.

In a multiple device network each device will preferably save information regarding each other device in the network. When a receiving device determines which other device will be the associated transmitting device, it chooses the stored information related to that device.

This could be accomplished by using a lookup table in each device that stores the relevant information for each other device. Thus as a first device begins receiving a signal from a second device, the first device extracts the relevant information relating to the second device from the table, adjusts the phase of its receiving clock to the expected phase, and then performs an acquisition using the expected phase as a starting point.

Preferably, a central controller, through a media access control (MAC) layer, coordinates which devices talk when and to whom, setting a schedule of transmission and reception. Thus each individual device will know whose information to use. In this way a receiving device can know which device is transmitting despite the fact that it hasn't acquired the incoming signal yet.

Consider an example in which eight devices are included in a network (device one through device eight) along with a central network controller (which may or may not be one of the devices). If the central controller says that during a given time period device three will transmit to device seven, for example, then device seven knows to go to its look-up table (or whatever means it has of storing information about other devices) to find an entry for device three. This table preferably includes at least information about the last known phase of device three.

In some embodiments the stored data may also include information regarding the frequency of device three and the time of the last known phase. In this case, the phase information for device three can be updated based on the known frequency and the elapsed time since the known phase to obtain an expected current phase value.

Regardless, device seven can then use either the last known phase information for device three, or the updated phase information for device three as a starting clock phase for its acquisition process.

In other embodiments the controller (i.e., the MAC layer) can keep the lookup table for the phases (and possibly frequencies) of each device and transmit this information to individual devices as it tells them transmission assignments. Each device could then keep information regarding only the phase of the controller to allow quicker acquisition of signals from the controller. But they would not need to keep information regarding the other devices, since the controller would provide that information to them.

Saving Information About Only Most Recent Communications

In an alternate embodiment, each device may only save a single set of information regarding the phase (and possibly frequency and last known acquisition time) of the device that it most recently received a signal from. This will reduce acquisition time if the same device transmits again, but not if a different one does. However, since the same transmitting device often sends multiple transmissions to the same receiving device, this can be helpful.

This also makes a great deal of sense with certain MAC structures in which the network has a schedule of transmission times. In such a scheme, time slots are often designated within this scheduled transmission time period. And within each slot the same two radios are generally transmitting to each other over and over again, sending packets of data to each other in succession.

Thus, within a given time slot, the first packet of data that a transmitter 110 sends to a receiver 120 will require the receiver 120 to perform a blind acquisition (i.e., one without any prior data regarding transmission clock phase). In practice, the receiver 120 will likely start with the saved phase information from the most recent time slot the receiver 120 participated in, but that phase will not necessarily have any correlation to the current phase of the transmitting device 110. However, every subsequent data packet that's transmitted by the transmitter 110 to the receiver 120 within the current time slot will gain the benefit of the saved transmitter information, which will allow the receiver 120 to perform a faster acquisition.

Once the system moves to the next time slot, however, there will be a new pair of radios assigned to that slot. If the same transmitter 110 and receiver 120 are assigned to that slot, then the stored phase information in the receiver will be relevant and will reduce the acquisition time immediately. If, however, a different set of radios are chosen, a new blind acquisition may be required.

In any given time slot assignment, the benefit of rapid initial acquisition will occur if the receiver 120 receives a signal from the transmitter 110 it most recently received from. This is true even if both devices have not been active for several time slots.

Regardless of whether the first acquisition is blind or not, after that first acquisition the new receiver 120 will certainly be able to store the proper phase data. Thus, for the remainder of that time slot the stored information will again be useful and fast acquisitions can be performed. And because there are generally many acquisitions in a time slot after the first acquisition, this can significantly cut down on overall acquisition time.

As with the prior example, the saved data regarding the transmitter 110 preferably includes data relating to the most recently known phase of the transmitter 110. In some embodiments, however, it may also include information relating to the frequency of the transmitter 110 and the time of the most recently acquired phase.

Acquisition with Transceivers

In many wireless systems devices will not operate simply as a transmitter or a receiver. More likely they are two devices will operate as transceivers, sharing information between each other. Even if one unit operates primarily as a transmitter and the other primary as a receiver, the primary receiver may well send acknowledgement information back to the primary transmitter. Thus, it is often necessary for both sides of a data link to synchronize their respective receiving clocks with the other's transmission clock.

Figure 4:
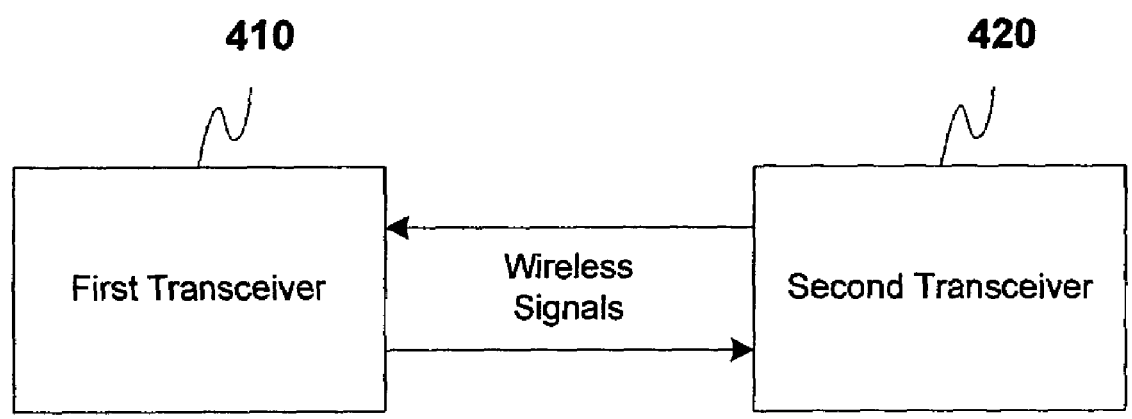
FIG. 4 is a block diagram showing a first transceiver 410 and a second transceiver 420, according to a preferred embodiment of the present invention.

In many embodiments the two devices in communication will actually be transceivers, as shown in FIG. 4. FIG. 4 is a block diagram showing a first transceiver 410 and a second transceiver 420, according to a preferred embodiment of the present invention. Each of the transceivers 410 and 420 at times performs the function of the transmitter 110 and receiver 120 of FIG. 1.

During operation, each device (i.e., each of the transceivers 410 and 420) may be in communication by sending the other packets of information or acknowledgement packets. Often, one device will transmit data packets, while the other transmits acknowledgement packets.

Thus, during normal operation the first transceiver 410 will send information to the second transceiver 420, and the second transceiver 420 will send information to the first transceiver 410. As a result, when the two enter into communication, the first transceiver 410 will have to synchronize (sync) with the second transceiver 420, and the second transceiver 420 will have to sync with the first transceiver 410.

Each transceiver 410, 420 can use the methods described above to perform this synchronization. As shown above, the transceivers 410, 420 may store information regarding the phase (and possibly the frequency and latest acquisition time) of all other devices in the network, or only information regarding the device most recently received from.

Regardless, upon entering into communications, it will take one full cycle back and forth between the first and second transceivers 410 and 420 for them both to sync up with each other, after which both transceivers 410 and 420 will have up-to-date information on the clock phase (and possibly the frequency and latest acquisition time) of the other. In other words, the first exchange between the first and second transceivers 410 and 420 may be a slow, blind acquisition. But later acquisitions will be quicker, having the benefit of the stored acquisition data.

Figure 5:
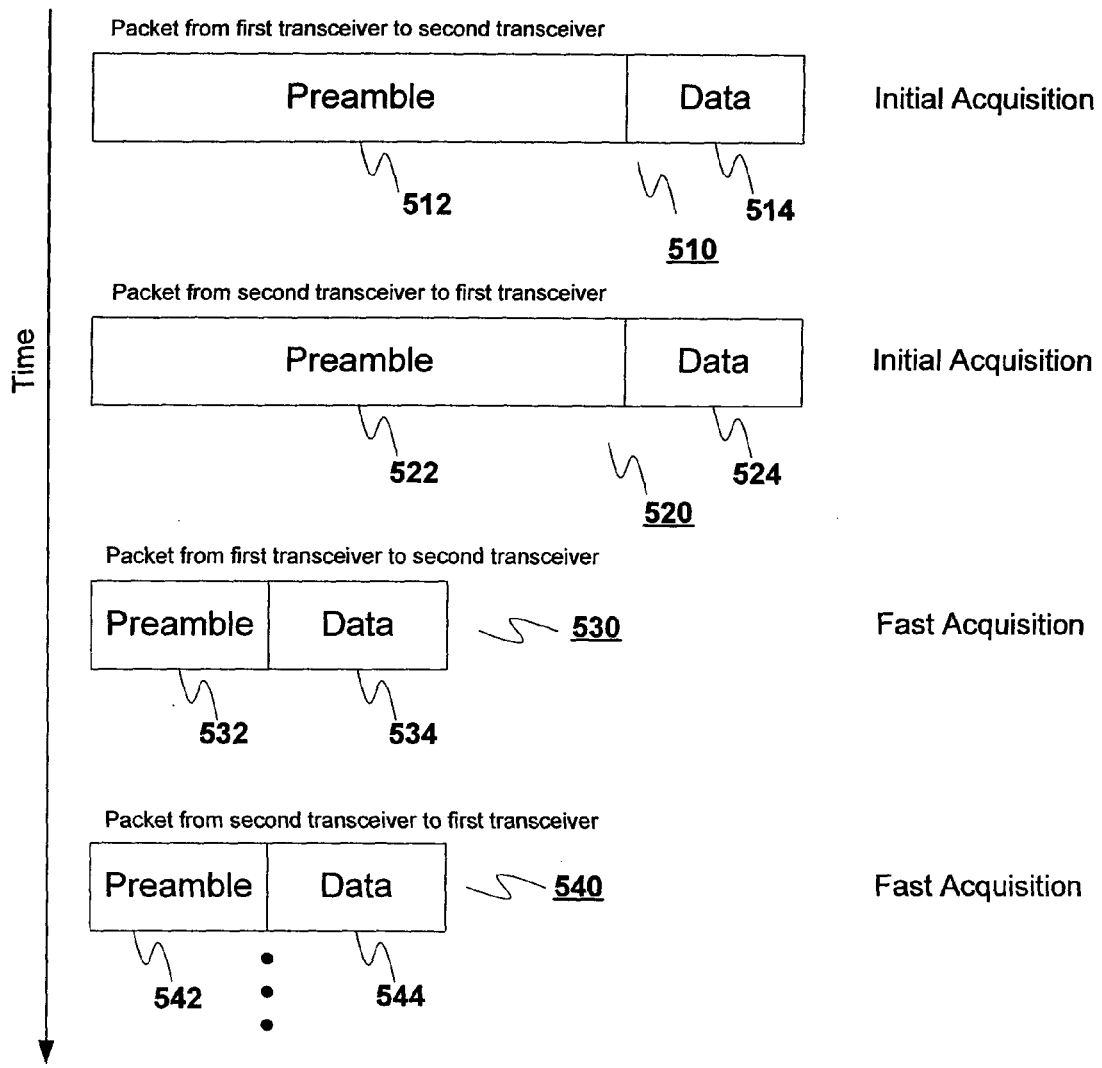
FIG. 5 is a diagram showing a series of packets transmitted between first and second transceivers during a given time slot, according to a preferred embodiment of the present invention.

FIG. 5 is a diagram showing a series of packets transmitted between the first and second transceivers 410 and 420 during a given time slot, according to a preferred embodiment of the present invention. In this embodiment the transceivers 410 and 420 only store information regarding the device that the particular transceiver 410, 420 most recently communicated with. However, alternate embodiments could include information. regarding each device in the network.

As shown in FIG. 5, within a time slot (such as a guaranteed time slot used in the IEEE 803.15.3 standard) there will be a back and forth mode of communication between the two devices currently in communication. Initially, the first transceiver 410 will talk to the second transceiver 420; the second transceiver 420 will then reply to the first transceiver 410; the first transceiver 410 will then send another frame to the second transceiver 420; the second transceiver 420 will again reply; and this back-and-forth transmission process will continue until the time slot is over. Often, the first transceiver 410 will be sending information, while the second transceiver 420 will be acknowledging receipt of the information.

However, although the disclosed embodiments often show a strict back-and-forth process between the first and second transceivers 410 and 420, with the first transceiver 410 and the second transceiver 420 alternating sending packets to each other, this need not be the case. One device could send packets more or less frequently than the other. For example, the second transceiver 420 might only periodically acknowledge the receipt of packets from the first transceiver 410. In such a case the first transceiver 410 might transmit several packets in a row before the second transceiver 420 transmitted one, or vice versa.

Each packet of information will preferably include a preamble and some data. By way of example, FIG. 5 shows the first four packets sent between the first transceiver 410 and the second transceiver 420. As shown in FIG. 5, a first packet 510 sent from the first transceiver 410 to the second transceiver 420 includes a first preamble 512 and a first data portion 514; a second packet 520 sent from the second transceiver 420 to the first transceiver 410 includes a second preamble 522 and a second data portion 524; a third packet 530 sent from the first transceiver 410 to the second transceiver 420 includes a third preamble 532 and a third data portion 534; and a fourth packet 540 sent from the second transceiver 420 to the first transceiver 410 includes a fourth preamble 542 and a fourth data portion 544

The first through fourth preambles 512, 522, 532, 542 each include a set pattern of information that the receiving device (e.g., the second transceiver 420 for the first preamble 512) can look for and synchronize with. Once the respective preamble 512, 522, 532, 542 begins, the receiving device begins listening, adjusts its receiver clock phase over time (which is sometimes called advancing the code wheel), and eventually locks onto the phase of the incoming signal.

Thus through the preambles 512, 522, 532, 542, the transmitter sends a set of known initial data before it sends the actual information in the data portion 514, 524, 534, 544. In the preferred embodiment both an analog and digital acquisition are performed, the analog acquisition aligning the analog chips and the digital acquisition aligning the digital symbols.

Since the receiver knows what this preamble data looks like, it knows how to use the preamble data during acquisition to synch up the receiving clock with the transmitting clock. In a preferred embodiment, this is accomplished by correlating that known data with a locally generated copy of that data to provide a correlation value. The resulting analog and digital correlation values are compared to set thresholds to determine whether acquisition is successful.

Because in this embodiment the transceivers 410 and 420 only store the information of the device they most recently communicated with, each transceiver 410, 420 must assume that the other transceiver 410, 420 will not have the proper acquisition phase data. And when a receiver does not have the proper acquisition information with respect to the transmitter clock phase, the preamble 512, 522, 532, 542 must be large enough to allow the receiver the time it needs to properly synchronize it's receiver clock phase with the transmitter clock phase.

Thus, in the example referred to in FIG. 5, when the first transceiver 410 transmits the first packet 510 to the second transceiver 420, it includes a large preamble 512 to allow for a blind acquisition by the second transceiver 420. The second transceiver 420 responds by transmitting a second packet 520 to the first transceiver 410, also including a large preamble 522 to allow for blind acquisition by the first transceiver 410. Although either of these initial acquisitions might take place more quickly (e.g., if the stored acquisition data happened to be the correct data for the given transmitter), the network assumes a worst case and allows for a full blind acquisition.

After these first acquisitions, however, the remainder of packets in the time slot will have an estimated transmission clock phase to start acquisition with. Thus, in later packets, the size of the preamble can be significantly reduced. This is seen, for example, in the third and fourth packets 530 and 540 in FIG. 5, each of which has a smaller preamble 512 and 514.

Thus, by storing acquisition data, each transceiver 410, 420 can reduce the preamble size for all but the first packet sent by each transceiver 410, 420, and in doing so can reduce total amount of time required for sending preambles during the course of the time slot. And by reducing the total amount of time in the time slot allotted to preambles, this will allow more data to be sent during a given time slot, thereby increasing the data transmission rate of the network. By paying an up-front cost of performing a blind acquisition and storing phase information, each transceiver can obtain sufficient information about the other transceiver to allow the later preambles to be smaller.

The size of the initial preamble 512, 522 for initial acquisition will vary depending upon the amount of data stored for each transceiver pair. If only information about the most recently heard from transceiver is saved, the preamble for initial acquisition must be set at or near its largest value (to allow for a blind acquisition). If, however, more information is stored about other transceiver pairs, the size of the initial preamble can be reduced.

The reason each transceiver can send a shorter preamble after the first one is that for later acquisitions, the receiving transceiver 410, 420 will start off at roughly the correct phase. However, each transceiver 410, 420 must send at least one long preamble to allow the other transceiver to perform an initial acquisition (which may need to be a blind acquisition in some embodiments).

One reason for this is that the phase of the transmitting clocks of the first and second transceivers 410 and 420 are not altered. Each transmits on its own local clock frequency (i.e., it's transmitting frequency), which is not altered during operation (though it may change over time due to physical constraints of the circuit). However, each transceiver 410, 420 generates a subsidiary clock signal (i.e., a receiving clock signal) that is used to sync up with the transmitting clock of the device sending the incoming signal Thus, each other device in the network can use the information it may have stored regarding a given device's local clock frequency to help synch up with that device. Even though the transmitting device may have altered its subsidiary clock signal a dozen times since the receiving device stored the relevant information, the local (or transmitting clock) will have remained unaltered.

One alternate embodiment would allow each clock to modify its clock during transmission so that the device would end transmission at the correct phase to receive. Unfortunately there are more issues involved than just the clocks of the transmitter and receiver being fundamentally in the wrong position. For example, the perceived phase of the transmitting device by the receiving device may not necessarily be the actual phase of the transmitting device because there are reflections off of walls and the like that can change what that phase looks like. As a result, in preferred embodiments, the receiver matches phase with the transmitter every time it receives a packet of information.

In addition, if the transmitter began to transmit on the frequency of the signal it last received, and both (or all) stations did so as well, there would be no frame of reference. In such a case, over time the frequency of both stations would begin to wander and there would be no predictability about their behavior. As a result, it is preferred that each device start at the same phase each time it transmits.

In other words, when the first transceiver 410 is transmitting, it will always transmit at a first base phase and its own fundamental frequency (a first fundamental frequency). Likewise, when the second transceiver 420 is transmitting, it will always transmit at a second base phase and its own fundamental frequency (a second fundamental frequency). And although each receiving unit may have to adjust the phase of its receiving clock to account for this when it receives a packet, this is preferable to having the transmitting frequency of the transceivers spiral out of control. The fixed reference of the transmission frequencies, i.e. fundamental frequencies, adds stability to the system.

This is one reason why the system includes long preambles at the beginning of a time slot, but then moves to shorter preambles during the remainder of the time slot. As noted above, the longer initial preambles allow for a first (potentially blind) acquisition, which may take some time. Later preambles are shorter, since they use a fast acquisition scheme that provides a good starting point for phase. And so, while in these later acquisitions the receiver has to perform the same sort of acquisition steps as with a blind acquisition, the fact that it starts off with a better estimate of phase means that acquisition will be quicker.

Adjustment of Phase Based on Differences in Frequency

Another important aspect of fast acquisition is knowledge on the part of the receiver of the transmission frequency of the transmitter. Thus, in the embodiment shown in FIG. 4, in a preferred embodiment, when a second transceiver 420 receives a packet from the first transceiver 410, it determines both an estimate of the phase position and frequency of the first transceiver. The frequency information is important because the frequencies of the transmitter clock and the receiver clock may not be identical.

The initial phase estimate allows the receiving device to bring its receiver clock into phase alignment with the transmitter's clock. For example, the phase estimate might tell the receiver to move its clock 3 ns to the left to bring it into phase alignment with the transmitter. And if the frequencies of the two clocks were identical, they would remain in lock step from that point on.

However, the realities of manufacturing mean that the frequencies of the two transceivers 410 and 420 will probably not be identical. This means that the first transceiver 410 and the second transceiver 420 are probably not operating at exactly the same frequency. And even the smallest difference will cause the phases of each of their clocks to slowly drift with respect to each other. For example, the first transceiver 410 may have a transmitting clock that is operating at 100.001 MHz, while the second transceiver 420 may have a receiving clock that is operating at 99.999 MHz. Over time, this will cause the two clocks to become out of phase, regardless of whether they were synchronized at any particular point.

Therefore, once the initial acquisition is completed and information is stored about the phase of the relevant transmission clock, a given transceiver will have to periodically update the stored phase information to keep the two devices in phase.

As a result, each device preferably performs a tracking function once acquisition has been completed. This tracking function allows the device to maintain an up-to-date estimate of the phase of the incoming signal, which in turn allows the receiving device to continue to perform fast acquisitions. Each transceiver 410, 420 does this by figuring out the frequency of the incoming signal, and then using this frequency information in conjunction with the acquired phase information to periodically update the estimated phase of the incoming signal.

The first step in this is for the receiving device to estimate the frequency of the signal sent by the transmitting device, i.e., the transmitting clock frequency. Frequency estimation is preferably performed by interpreting an error signal that is generated based on the incoming transmitted signal. The receiving device calculates this error signal, and uses it to give a measure of phase error. Each receiver tracks the error signal over time, and uses the error signal to estimate the frequency of the incoming signal.

One problem with this error signal is that the speed of calculating the frequency estimate is proportional to the noise in the system. If you want to quickly converge on a value for estimated frequency, the estimate will be noisy. However, if you want a quiet estimate of frequency, it will take a long time to converge on a final value.

Figure 6A:
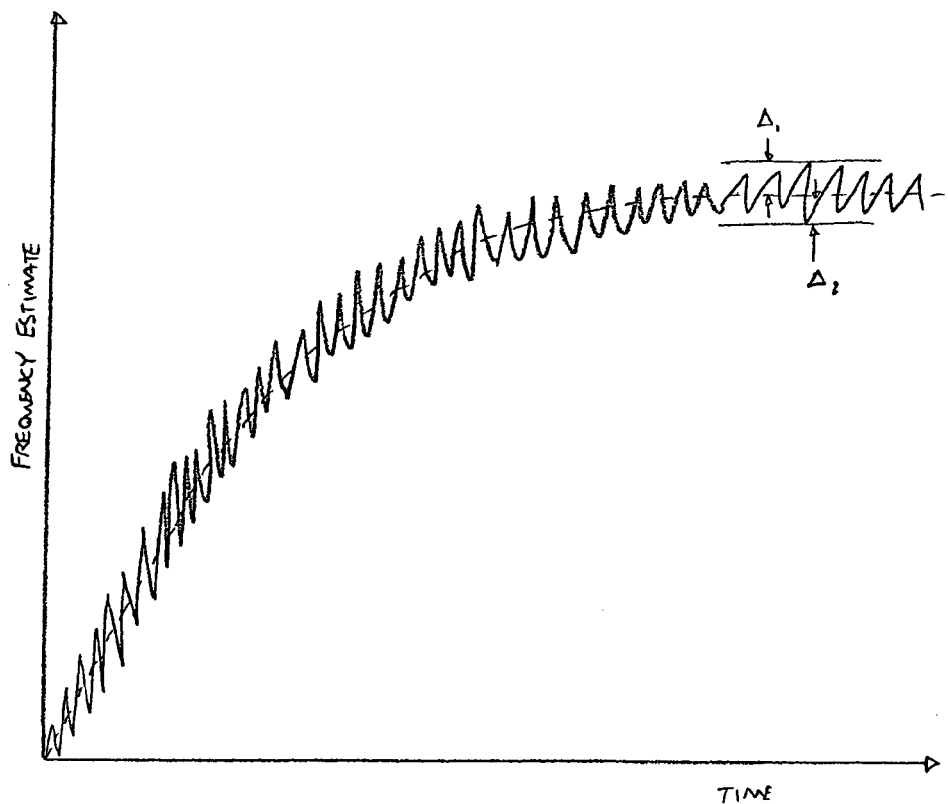
FIGS. 6A and 6B are graphs of frequency estimates over time, according to a preferred embodiment of the present invention.
Figure 6B:
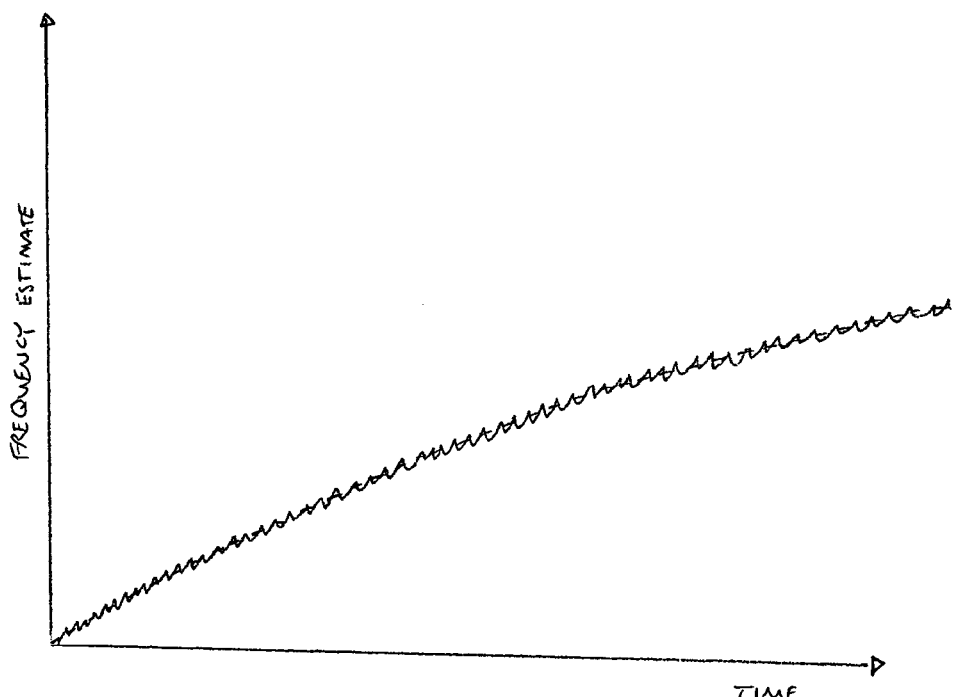

This can be seen for example in FIGS. 6A and 6B, which are graphs of frequency estimates over time. FIG. 6A uses parameters that provide for the estimate to quickly converge to a stable value, while FIG. 6B uses parameters that reduce the noise. As shown in FIGS. 6A and 6B, there is a noise in each estimate, i.e., a variance in the estimate over time. As shown in FIG. 6A, this means that at any given point in time, when you take the estimate, it may be off by an amount up to $\Delta_1$ above the true value or $\Delta_2$ below the true value.

One reason that this is a problem is because, when the current packet is over, the receiving device will have to pick a number to use as the estimated transmitter frequency. This number will be used to predict the former transmitter's future behavior. As such, the accuracy of that estimate will determine how well the receiver will predict the transmitter's current transmission phase when it next receives a packet from the transmitter, which current transmission phase will have drifted over time.

However, although tracking of the error signal is a preferred method of frequency estimation, any suitable alternate method of frequency measurement or estimation can be used.

Figure 7:
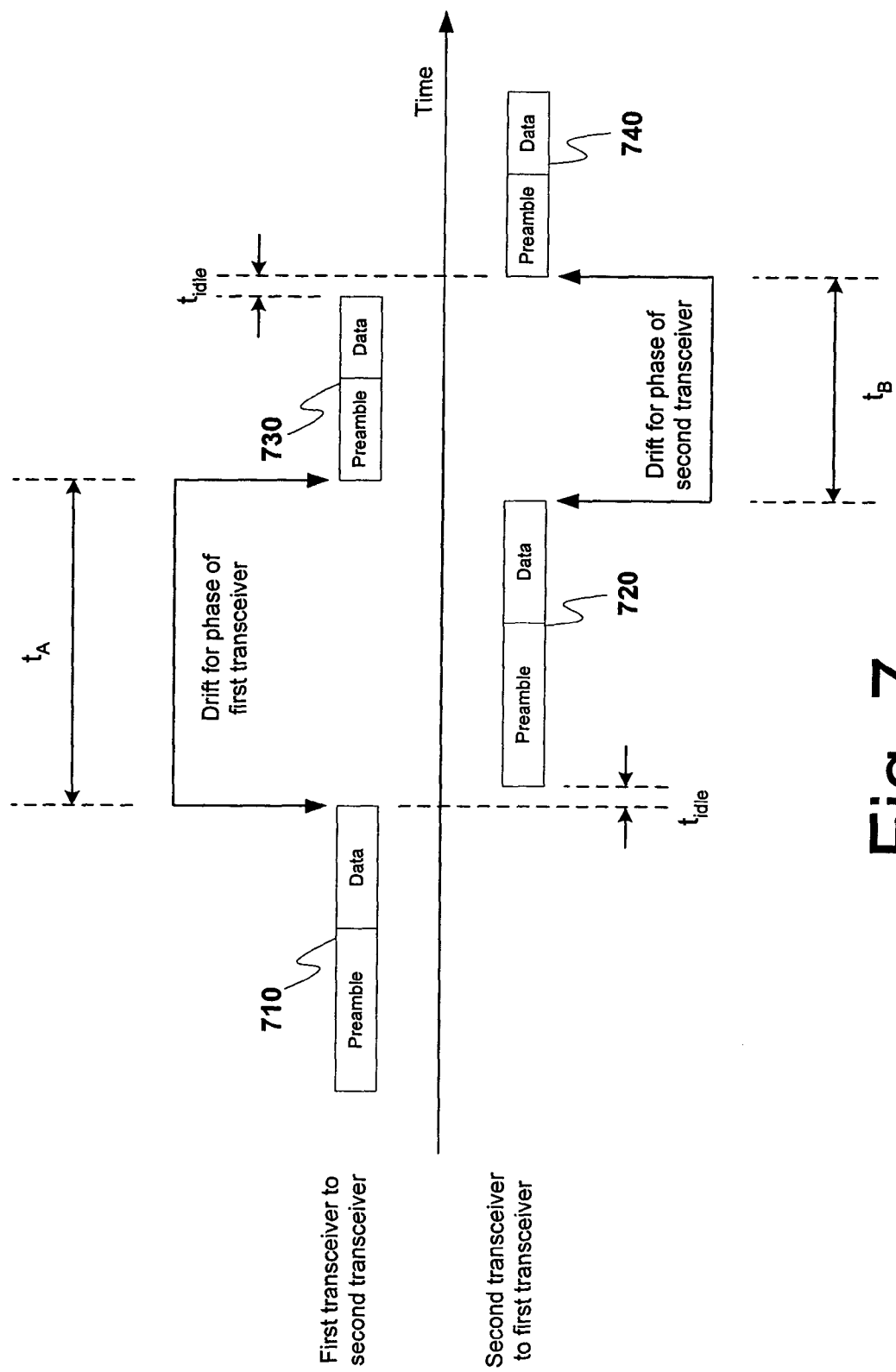
FIG. 7 is a diagram showing frequency drift between packets transmitted between two devices in the system of FIG. 4.

FIG. 7 is a diagram showing how the frequency can drift between packets transmitted between two devices in the system of FIG. 4. As shown in FIG. 7, four packets 710, 720, 730, and 740 are transmitted between the first and second transceivers 410 and 420. The first transceiver 410 transmits first and third packets 710 and 730 to the second transceiver 420, and the second transceiver 420 transmits second and third packets 720 and 740 to the first transceiver 410. An idle turn-around time $t_{idle}$ may be provided between packets.

The transmitter begins by transmitting the first packet 710. As described above, this first packet 710 has a large preamble to allow for initial (possibly blind) acquisition. After transmission of the first packet 710 ends, the phase of the transmitting clock in the first transceiver 410 will continue to drift with respect to the phase of the receiving clock in the second transceiver 410 (e.g., because of small differences in the frequencies of the two clocks). However, the second transceiver 420 will be deaf to these changes since it's not listening to the first transceiver 410 during the first drift period $t_A$.

This is true even when second transceiver 420 is transmitting the second packet 720 to the first transceiver 410. In this case the second transceiver 420 will be transmitting using its transmitting clock, i.e., it's own fundamental clock, while the first transceiver 410 will be receiving using its receiving clock, which it will be synchronizing with the transmitting clock of the second transceiver 420.

Once the first transceiver 410 has stopped transmitting the first packet 710, the only information that the second transceiver 420 has to predict the current phase of the transmitting clock of the first transceiver 410 is the last known phase and frequency estimates for the first transceiver 410, as well as the elapsed time since the last transmission. When the first transceiver 410 starts transmitting the third packet 730, the second transceiver 420 will have to estimate the transmitting phase of the first transceiver 410 based on this frequency estimate. And it is this phase estimate that will facilitate a fast acquisition process and allow the preamble of the third packet 730 to be shorter than that of the first packet 710.

Thus, when the second transceiver 420 receives a subsequent packet from the first transceiver 410, it will preferably determine its starting phase estimate by adjusting the last known phase estimate for the first transceiver 410 based on the frequency estimate for the first transceiver 410 and the time elapsed since that estimate was made. Any error in the frequency estimate (such as the error caused by the noise in the estimate signal) will cause increasing errors in the phase estimate.

Similarly, once the second transceiver 420 has stopped transmitting the second packet 720, the phase of the transmitting clock (i.e., the fundamental clock) of the second transceiver 420 will begin to drift with respect to the receiving clock of the first transceiver during the second drift period $t_B$. At this point, the only information that the first transceiver 410 has to predict the current phase of the transmitting clock of the second transceiver 420 is the last known phase and frequency estimates for the second transceiver 420, as well as the last known time of transmission. When the second transceiver 420 starts transmitting the fourth packet 740, the first transceiver 410 will have to estimate the transmitting phase of the second transceiver 420 based on its last stored frequency estimate for the second transceiver 420. And it is this estimate that will facilitate a fast acquisition process and allow the preamble of the fourth packet 740 to be shorter than that of the second packet 720.

Thus, when the first transceiver 410 receives a subsequent packet from the second transceiver 420, it will determine its starting phase estimate by adjusting the last known phase estimate for the second transceiver 420 based on the frequency estimate for the second transceiver 420 and the time elapsed since that estimate was made. Any error in the frequency estimate (such as the error caused by the noise in the estimate signal) will cause increasing errors in the phase estimate.

Each receiver estimates the future phase of an incoming signal based on the estimated phase and frequency of the last signal transmitted by the current transmitter, as well as the time elapsed since the phase estimate was made. Thus, the more accurate the frequency estimate, the more accurate the resulting adjusted phase estimate will be, i.e., the closer the system will be to the actual frequency of subsequent transmissions. This translates into a shorter allowable preamble. As a result, it is desirable to get the frequency estimate to be as accurate as possible.

Although in this embodiment frequency estimates are used to more accurately adjust acquisition starting phases, alternate embodiments could remove this feature and simply use the last stored transmission phase. This will still be a better phase estimate than a random value and will still reduce required preamble sizes. However, while required preamble sizes will be smaller than for blind acquisition, they will be larger than if periodic adjustments to stored phase are made based on frequency estimates.

Frequency Measurement and Estimation

Figure 8:
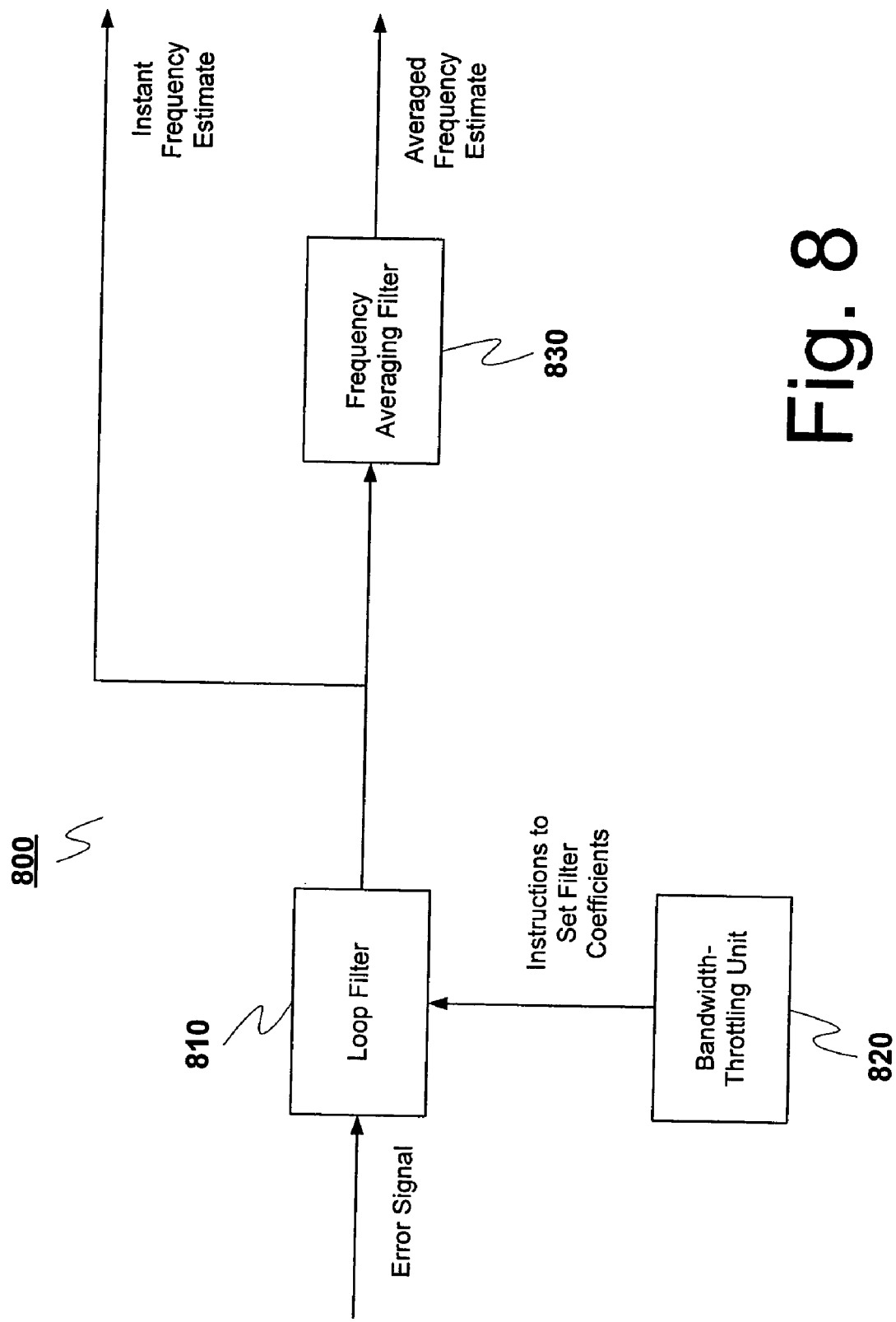
FIG. 8 is a block diagram showing a system for accurate frequency measurement and estimation, according to a preferred embodiment of the present invention.

FIG. 8 is a block diagram showing a system for accurate frequency measurement and estimation, according to a preferred embodiment of the present invention. As shown in FIG. 8, a frequency estimation circuit 800 includes: a loop filter 810, a bandwidth throttling unit 820, and a frequency averaging filter 830.

The loop filter 810 (also called the tracking filter or the frequency tracking filter) is a filter that interprets the error signal, i.e., the phase error, and computes an instantaneous frequency estimate (i.e., an instantaneous estimate of the frequency of the incoming signal). The loop filter 810 thus looks at the error signal, determines how big the error is, and based on that provides a frequency estimate. The loop filter preferably produces a new revised estimate every clock period, which means that it can be an extremely noisy signal. However, as time goes on, and more packets are received, the loop filter will converge to a point. This can be seen in FIGS. 6A and 6B, which show are graphs of frequency estimates over time.

Alternate systems have used a very low bandwidth filter. Such a system would get a result periodically every few clock cycles. However, the preferred embodiment operates more instantaneously, providing a real-time estimate of frequency The loop filter 810 (or frequency tracking filter) tracks the incoming signal and produces a frequency number that is used to directly adjust the receiving clock of the receiving device (i.e., the fundamental clock of the device as it is modified to operate as a receiving clock). In other words, every clock cycle the frequency tracker will tell the receiving clock to go faster, remain the same, or go slower, as appropriate. Thus, the system modifies the clock in real time, i.e., it produces real-time frequency estimates.

Unfortunately, as shown in FIG. 6A, the real-time frequency estimate can be a very noisy number when it is set to achieve quick convergence. And so the bandwidth throttle 820 is added to ultimately lessen the noise. The bandwidth throttle 820 breaks up the acquisition time into a number of time periods (four in the preferred embodiment). Within these time periods the bandwidth throttle 820 can change the filter coefficients of the loop filter 810, which coefficients essentially control the bandwidth of the loop filter 810.

As the bandwidth throttle 820 changes the bandwidth of the loop filter 810, the response of that filter 810 will change. Depending upon the coefficients chosen, the system could be very noisy (i.e., have a very bad estimate of frequency) but get to the steady-state period quickly; the system could be very quiet (i.e., have little variance in its frequency estimate) and take a comparatively long time to reach the steady-state period; or operate somewhere in between.

Preferably, system uses noisy filter parameters to quickly approach a steady-state point, and then slowly reduce the noise in the filter once it approaches the steady state point. This is preferably done in stages, which are preferably accomplished through software by programming the values of the coefficients and how long the system should use those coefficients. The advantage of software switching over hardware switching is that it can be done very quickly. Although software switching is preferable, alternate embodiments could use hardware switching.

Figure 6C:
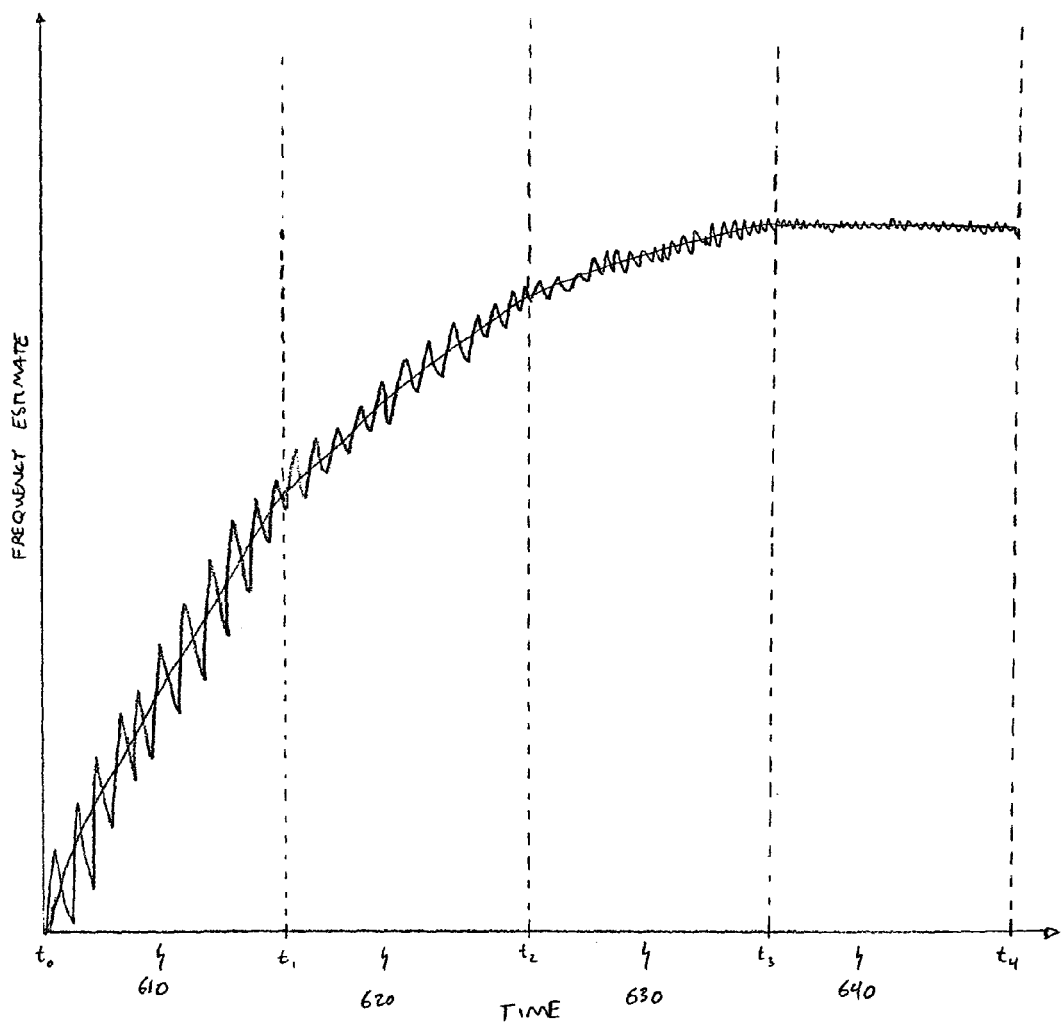
FIG. 6C is a graph of a frequency estimation process performed in four steps, according to a preferred embodiment of the present invention.

An example of this is shown in FIG. 6C, which is a graph of a frequency estimation process performed in four steps. As shown in FIG. 6C, the system goes from a very quick but very noisy filter (during a first time period 610 from $t_0$ to $t_1$), to a quick but noisy filter (during a second time period 620 from $t_1$ to $t_2$), to a slow but quiet filter (during a third time period 630 from $t_2$ to $t_3$), to a very slow but very quiet filter (during a fourth time period 640 from $t_3$ to $t_4$).

A multiple step process is advantageous because it can be difficult or impossible to start with filter coefficients that make the filter very quiet but very slow. In such a case the system may not be able to react fast enough when the device starts to acquire and lock. At this time there is a large error and there may be a small phase offset and a large frequency offset. If the system can't move fast enough, it will simply lose the lock and thus lose the signal.

The preferred embodiment avoids this problem by initially following the incoming signal quickly but noisily, sacrificing accuracy for an ability to keep the lock during the first time period 610. Then, as the system progresses in acquiring the frequency during the second through fourth time periods 620, 630, and 640, it begins to get a sense for where the frequency is at, i.e., it sets a baseline estimate. As it refines the baseline, the system can tighten up the coefficients, reducing noise without risking losing the track. It can do this because by the point it changes the coefficients to reduce noise, the frequency estimate is already somewhat accurate. And as the accuracy further increases, the noise can be further reduced.

As shown in FIG. 6C, this system gets a response that starts very noisy, but gets up fast to the general area of estimated frequency (first time period 610). It may even overshoot the correct frequency because it's only marginally stable at this point. Since it's not entirely stable, the frequency estimate may jump wildly around. But then as the system enters each of the subsequent stages (second through fourth time periods 620, 630, and 640) it will get a little bit quieter until by the end (fourth time period 640) it should be sufficiently quiet for the desired level of operation.

In the preferred embodiment, the duration of these steps is preferably between zero and about 2.5 microseconds each, though this number can vary depending upon the type of response desired for the frequency estimate. Furthermore, these durations are preferably programmable, e.g., through the use of a register.

Also, although the preferred embodiment shown in FIG. 6C shows four steps used in the bandwidth throttle 820, more or fewer steps could be used to get the desired operation parameters In some situations, however, this frequency estimation may not be adequate. Even by the tail end of the acquisition (fourth time period 640), the system still has a certain amount of noise. And even though the bandwidth has been trimmed down by the multiple step acquisition process, there remains an error, as shown by a standard deviation of the frequency estimate. This standard deviation tells just how much the estimated frequency will vary. The greater this error in frequency, the greater the compounded error in phase estimate will be as time progresses.

Therefore, to allow for a longer maximum coast time (i.e., the maximum allowable time in between when a device receives transmissions from another device), it is desirable to reduce this frequency error as much as possible. Ultimately it is desirable to reduce the error sufficiently so that each device be able to successfully coast for expected durations between when a given transmitting device will stop transmitting to another device and when the transmitting device begins transmitting again (e.g., times $t_A$ and $t_B$ in FIG. 7).

As shown in FIG. 7, the coast time may also include an idle turn-around time $t_{idle}$ between packets, the length of a preamble, and the length of the data transmission. The idle time $t_{idle}$ is preferably on the order of a couple of microseconds. The length of the preamble may also vary depending upon the actions of the other transceiver in the pair currently in communication. For example, when the transceiver must perform a blind acquisition, a longer preamble is required. The length of the preamble is added to the length of the data transmission to obtain the total length of the packet, which can be up to 100–200 microseconds in some embodiments. And this length can increase if more data is sent in a given packet, thus increasing the length of the packet.

Thus, the total coast time may be long when the other transceiver must perform a blind acquisition (which requires a longer preamble), as shown by time $t_A$. However, if the other transceiver is performing a fast acquisition (which allows for a shorter preamble), as shown by time $t_B$, the coast time can be reduced. Nonetheless, the system must be able to accommodate the longest possible coast time.

Although the present embodiment only shows a system that allows coasting within a given time slot, in alternate embodiments the system parameters can be chosen to have fine enough resolution that a device can coast between individual time slots in a superframe, or even for an entire superframe, which includes many time slots.

As noted above, after the bandwidth-throttling unit 820 performs its function, the error in the first frequency estimate is reduced. However, in some embodiments this first frequency estimate must be further refined. One reason for requiring a better estimate of frequency is to allow a device to coast for a longer amount of time, e.g., an entire superframe including turnaround times, multiple frames, or maybe one very large frame.

Returning to FIG. 6C, we can see that after the fourth time period, the system has a relatively quiet frequency estimate. The system then uses the frequency average filter 830 to filter these frequency estimates to obtain a better final estimate. So, after the acquisition has settled down to the most quiet it will be (i.e., the loop filter has its most precise parameters), the frequency average filter 830 produces an average frequency value based on a number of input instantaneous frequency estimates.

The preferred embodiment uses a leaky filter, which has some memory in it and which is able to reject a lot of the noise that comes in. Although a leaky filter is a comparatively slow-moving filter, the system makes it programmable by allowing a number of the coefficients of the filter to be changed by software. By manipulating the coefficients, the filter can be made to converge quicker. As with the acquisition, it is necessary to trade off between converging quicker and less accuracy. In the preferred embodiment the frequency average filter 830 has a window size of $2^{13}$ (8192), and has a value for $\alpha$ of $2^{-9}$ (1/512) although these values can be changed in alternate embodiments. Alternate embodiments could use other types of averaging filters for the frequency average filter 830.

The frequency average filter 830 allows the system to achieve an increased accuracy level for the frequency estimate. In the preferred embodiment this resulted in a thirty-Hertz accuracy for the frequency estimate (i.e., the standard deviation of the frequency estimate is 30 Hz).

For the preferred embodiment, a thirty Hertz accuracy for the frequency estimate will allow a device to coast blind for a sufficient period of time within a time slot, while maintaining an adequate estimate of phase. However, by changing the type and design of the frequency average filter, the accuracy of the final frequency estimate can be increased.

Fast Acquisition

Ultimately, the goal of the acquisition method and system is to maintain a good phase estimate. First the system acquires the initial phase of the other device that is communicating with it. Then it estimates the frequency of the other device. This frequency estimate then allows the current device to more quickly acquire the next phase of the other device at some future time.

This involves two primary methods: a method of quickly acquiring a UWB signal (i.e., acquiring the clock phase of the incoming signal), and a method of estimating frequency for a UWB signal.

The method of fast acquisition involves taking the prior measurement of frequency and phase for a given device (i.e., for that device's clock) and calculating a new phase estimate based on those stored values.

Figure 9:
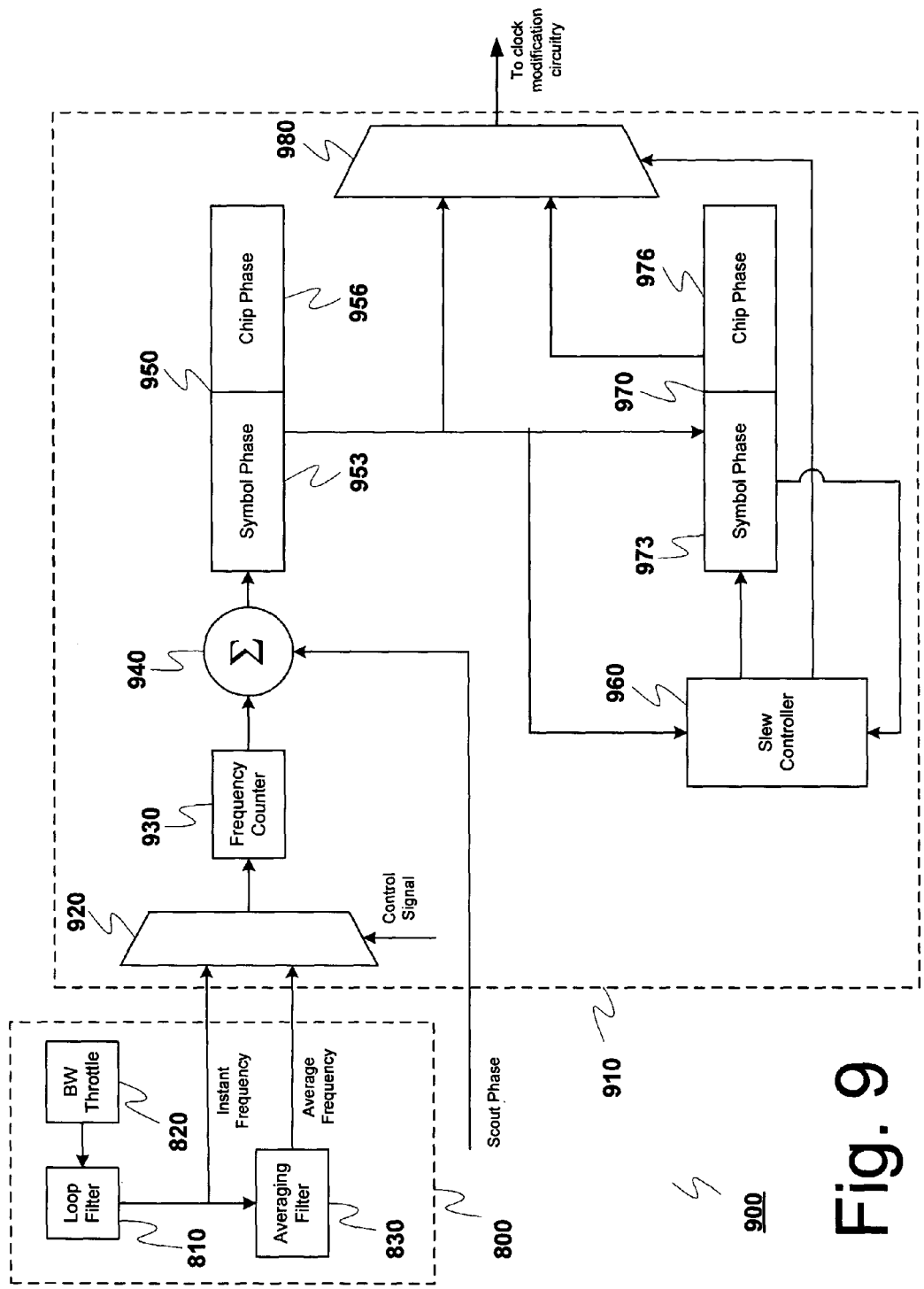
FIG. 9 is a block diagram of a tracking circuit for use in a fast acquisition circuit, according to a preferred embodiment of the present invention.

FIG. 9 is a block diagram of a tracking circuit for use in a fast acquisition circuit, according to a preferred embodiment of the present invention. As shown in FIG. 9, the tracking circuit 900 includes a frequency estimation circuit 800 and a numerically controlled oscillator (NCO) 910. The frequency estimation circuit 800 includes a loop filter 810, a bandwidth throttling unit 820, and a frequency averaging filter 830, as shown in FIG. 8, and the NCO 910 includes: a frequency selector 920, a frequency counter 930, a summer 940, a first symbol phase/chip phase register 950, a slew controller 960, a second symbol phase/chip phase register 970, and a phase controller 980. The frequency estimation circuit 800 determines a frequency estimate, and the NCO 910 stores that instantaneous frequency estimate when the device switches from an acquisition mode to a coast mode, and then uses the stored frequency to calculate a new phase for use when it switches back from a coast mode into an acquisition mode for the next frame acquisition.

The frequency estimation circuit 800 operates as described above with respect to FIG. 8, and produces an instantaneous frequency value and an average frequency value. The frequency selector 920 comprises a multiplexer that chooses between the instantaneous frequency value and the average frequency value.

The frequency counter 930 determines the frequency value passed to it by the frequency selector to a high degree of precision. The precision of the estimate may be accomplished in a number of ways.

The circuitry of the preferred frequency counter 930 used by the system preferably comprises a digital counter with a set number of bits in it. The number of bits in that counter will determine how small a unit of frequency the hardware can actually represent, independent of how noisy the estimate is. In other words, the number of bits in the counter will determine the smallest increment of frequency that can be counted. This can be referred to as the least significant bit (LSB) frequency, i.e., the smallest frequency increment that you can represent in the hardware. The more bits used in the frequency counter 930, the smaller the LSB frequency will be, and the finer the possible measurement of the frequency estimate.

Preferably the frequency counter 930 includes at least 16 bits, and most preferably the frequency counter 930 includes at least 24 bits. However, any number of bits can be used so long as the resulting accuracy of the frequency is adequate for the system needs. In the preferred embodiment, the system can represent a frequency change of as small as half of a Hertz (0.5 Hz). In other words, the stored frequency estimates can be precise to ±0.5 Hz, which is very fine for frequencies that are often in the range of 100 MHz.

The hardware resolution of the system sets the bottom line on how precise the frequency estimate will be. By having a very fine hardware resolution, the system can increase the allowable precision of the frequency estimate.

The summer 940 adds the value output from the frequency counter 930 with a scout phase during certain parts of acquisition. In an acquisition mode, the output from the frequency counter 930 remains constant. A controller can then vary the scout phase according to a known progression (using a constantly increasing and cycling number in the preferred embodiment) until an acquisition filter (not shown) is satisfied with the phase/frequency lock point (i.e., acquisition is successful and the acquisition mode ends). Once the device moves from the acquisition mode to a tracking mode (or later a coast mode), the scout phase will remain constant and the value output from the frequency counter 930 will vary. This output frequency estimate will be used to vary the chosen scout phase up or down to adjust for the frequency (or frequency estimate) of the transmitted signal.

The first symbol phase/chip phase register 950 comprises a first symbol phase resister 953 and a first chip phase register 956. The slew controller 960 controls the value in the second symbol phase/chip phase register 970. The second symbol phase/chip phase register 970 includes a second symbol phase resister 973 and a second chip phase register 976. The phase controller 980 comprises a multiplexer that chooses between the output of the first symbol phase/chip phase register 950 and the second symbol phase/chip phase register 970.

The NCO 910 takes values output by the loop filter 810 or the averaging filter 830 and produces a frequency adjustment, i.e., a value that will be used to adjust the local clock frequency. The NCO 910 thus creates an oscillation based on the frequency adjustment number.

In operation the NCO 910 performs all of the mechanics that control the phase and frequency estimates used during tracking and the phase and frequency estimates used during the coast period. It also performs the mechanics for moving back and forth between acquisition and coast modes, and storing information during the coast period, which enables the system to perform fast acquisition.

Throughout this description the terms symbol phase and chip phase will be used. They relate to the local clock period, which is a 10-nanosecond period in the preferred embodiment. In other words, every 10 nanoseconds in the preferred embodiment a new symbol, i.e., a piece of symbol data that represents either a one or a zero, is generated. These symbols are then interpreted digitally from the analog circuitry. However, each symbol is actually broken up further. In the preferred embodiment there are actually thirteen small chips that make up each one of these symbols.

Figure 10B:
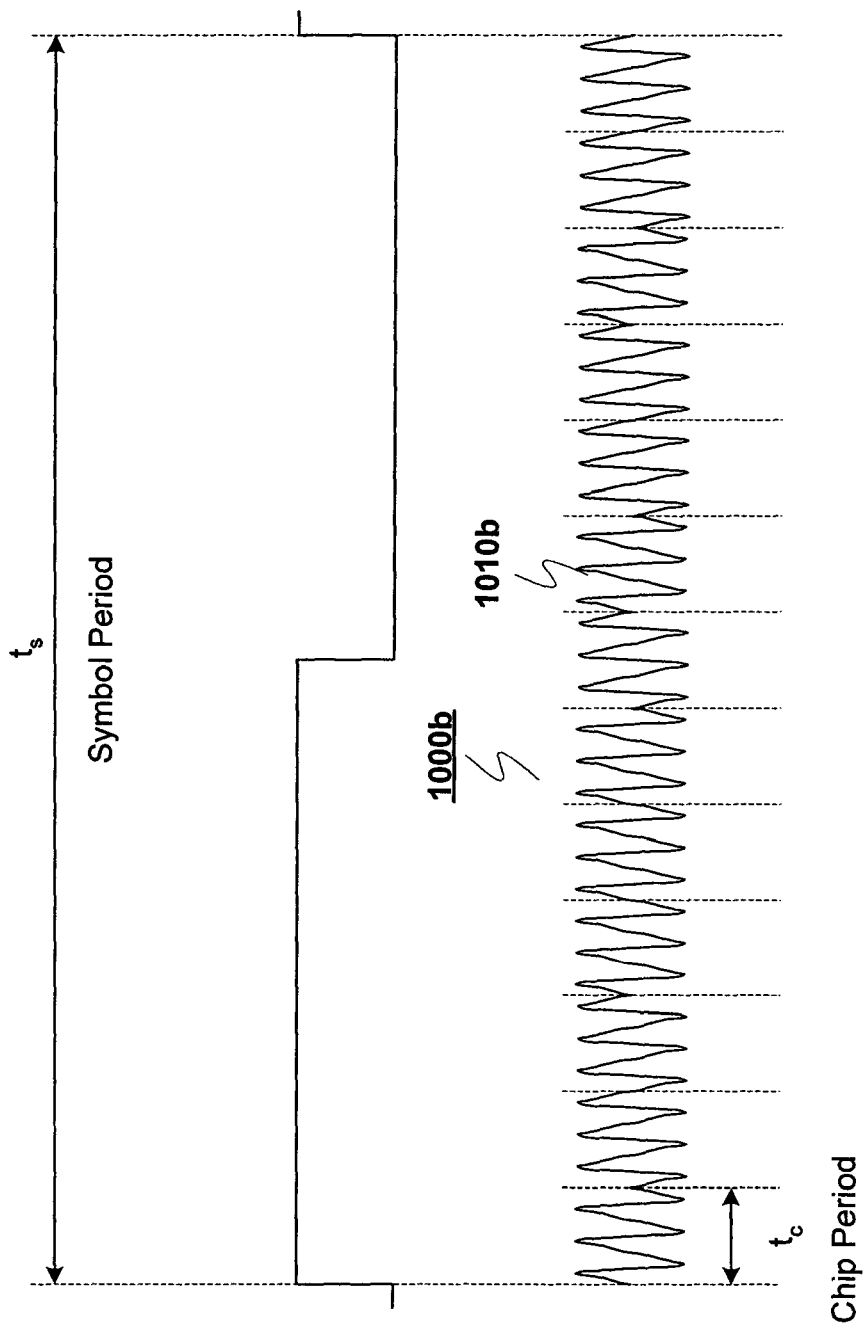

FIGS. 10A and 10B are timing diagrams of symbols that have thirteen chips, according to preferred embodiments of the present invention. As shown in FIGS. 10A and 10B, a single symbol 1000a, 1000b that is used to represent a "1" or a "0" is represented by a plurality of individual chips 1010a, 1010b. In the preferred embodiment thirteen chips are used for a symbol. However, in alternate embodiments more or fewer chips can be used per symbol.

In the embodiment shown in FIG. 10A, the individual chips 1010a are monopulses that are bi-phase modulated. In the embodiment shown in FIG. 10B, the individual chips 1010b are portions of an oscillating signal that are bi-phase modulated. Although in FIG. 10B three repetitions of the oscillating signal are used to represent each chip, more or fewer repetitions could be used in alternate embodiments.

Thus, as shown in FIGS. 10A and 10B, each symbol has a symbol period $t_s$ that represents the period of the thirteen chip symbol 1000, and a chipping period $t_c$ that represents the period of one of the individual chips 1010 in the symbol 1000. In the preferred embodiment the symbol period $t_s$ is 10 nanoseconds and the chipping period $t_c$ is 770 picoseconds. These numbers can be varied in alternate embodiments.

This use of multiple chips in a symbol also influences the estimation of phase for a receiving device. When the receiving device adjusts its receiving clock, it preferably makes adjustments that are smaller than the chipping period. In the preferred embodiment each device has two hundred and fifty-six discreet locations that it can move its clock phase within each chip.

The receiving device adjusts the phase of its receiving clock in one direction or another, and at some point may make sufficient adjustments so that it will move the receiving clock into the next chipping period.

In one preferred embodiment, the system only remembers the chip phase, i.e., what step within a given chip the phase was at. This could be a simple eight-bit number that indicates a chipping phase.

In the preferred embodiment shown in FIG. 9, however, the system also monitors when it moves from one chip to another chip. This is important so that the system can determine not only when the chips are lined up with each other, but when symbols are lined up as well. Otherwise the system might register an acquisition when only the chipping phase was determined. This is because at the point that the phases align, the chips may be properly aligned, but the symbols may not. For example, the first chip in the symbol generated by the transmitter might align with the fourth chip of the symbol generated by the receiver. The alignment of phase would be identical with respect to individual chips, although it would be drastically different in terms of symbols, and thus acquisition would not be good.

As a result, the preferred embodiment of FIG. 9 has to remember an additional piece of information: the chip location in the symbol. Because of this, the current design includes a symbol phase register. This allows the system to store not only what phase the device is at, but what chip it is at in the current symbol. And as the system moves from boundary to boundary between symbols, it will adjust the chip location accordingly Thus, the system could determine the current phase by chip phase and symbol phase, e.g., the $37^{th}$ phase increment in the $7^{th}$ chip. Once it reaches the last position in one chip, e.g., the $256^{th}$ position in the $7^{th}$ chip, it can advance to the $1^{st}$ position in the $8^{th}$ chip. Then, once the system reaches the last chip in the symbol, e.g., the $13^{th}$ chip in the preferred embodiment, it can wrap around back to the $1^{st}$ chip again.

This gives the system a sort of circular phase. Once the system travels three hundred and sixty degrees around, it comes back to the point it started from (though in this case it isn't 360 degrees, but a number of increments equal to the number of chips per symbol multiplied by the number of phase increments per chip). This means that in the current preferred embodiment it's only necessary to remember the phase within the current chip and the number of the current chip to maintain a good phase estimate.

This phase estimation function is performed in the first symbol phase/chip phase register 950. The first symbol phase/chip phase register 950 includes two linked rollover registers: a first symbol register 553, and a first chip register 556. The first chip register 556 determines the chip phase $t_c$ by storing a number representative of the relative position of the chips as the locally generated frequency is altered (i.e., as the receiver rotates through the code wheel). In the preferred embodiment the first chip register 556 stores a number between 0 and 255, though in alternate embodiments this could vary.

As the first chip register reaches its maximum value (255 in the present embodiment), it rolls over back to 0, and increments the first symbol register 556 by one.

The first symbol register keeps track of what chip within the symbol the locally generated clock is currently at by storing a number representative of that chip, e.g. between 0 and 12 for the preferred embodiment. As this register reaches its maximum amount, it too rolls over, indicating that the system has left one symbol and has entered another.

The value in the first symbol phase/chip phase register 950 is continually updated by real-time phase and frequency data when its associated device is in an acquisition or tracking mode. Once the device enters a coast mode (i.e., it stops receiving a signal), the value in the first symbol phase/chip phase register 950 is then updated based on estimated frequency data until the next time the device enters an acquisition mode.

The second symbol phase/chip phase register 970 preferably mirrors the information contained in the first symbol phase/chip phase register 950 during tracking. This value is preferably updated in real time during the , though it can also be updated only periodically in alternate embodiments, e.g., when the device enters a coast mode.

One important thing that this NCO circuitry 900 of FIG. 9 does is to not only allow a given device that uses it to monitor an incoming phase and frequency, but also to allow the device to continue to transmit signals at an unchanging transmit phase and frequency.

The phase controller 980 produces control signals that are sent to the circuitry that actually adjusts the local clock to set the phase of the receiving clock. This circuitry can include ROM lookup tables that create sine waves, etc. Regardless of how it is done, the output signal of the phase controller 980 preferably controls the frequency and phase of the receiving clock.

This phase controller 980 can receive information from one of two sources: one for fast acquisition/tracking and one for when it is coasting. Depending upon the mode the device is in, the phase controller 980 will switch its input between the first symbol phase/chip phase register 950 and the second symbol phase/chip phase register 970.

In the embodiment shown in FIG. 9, the phase controller 980 takes its input from the first symbol phase/chip phase register 950 when the device is performing acquisition or tracking. When the receiving device is performing acquisition or tracking, the phase information in the first symbol phase/chip phase register 950 is controlled in real time. The averaging block 910, frequency selector 920, frequency counter 930, summer 940, and first symbol phase/chip phase register 950 continually update the stored phase information as long as a signal is being received. The phase controller 980 uses this information to generate a local clock that is as close as possible to that of the current transmitting device.

But the phase controller 980 takes its input from the second symbol phase/chip phase register 970 when the device is in a coast mode (i.e., not receiving a signal and either transmitting or remaining idle). When the receiving device is coasting, the phase information in the second symbol phase/chip phase register 970 remains stable (aside from a slewing function at the start of the coast mode). This allows the device to transmitting at its standard fixed transmission phase and fixed transmission frequency, regardless of the receiving frequencies it uses.

As noted before, preferably each device always transmits at its fundamental frequency and its fundamental phase. Thus, it is desirable to return the local clock to its fundamental phase and frequency (i.e., the value stored in the second symbol phase/chip phase register 970) for transmission. But it is also desirable to remembering the most recently used receiving phase and frequency (i.e., the value stored in the first symbol phase/chip phase register 950).

As shown in FIG. 9, this is accomplished by having some circuitry that updates the receiving clock, but does not affect the transmitting clock. This is accomplished in particular through the use of duplicate registers: the first and second symbol phase/chip phase registers 950 and 970.

In operation, the tracking/coasting controller 920 selects between an instant frequency provided by the loop filter 810 and an average frequency value provided by the averaging block 910. During a tracking/acquisition mode, the instant frequency is continually updated and the average frequency is either instantly or periodically updated. During a coasting mode, there is no instant frequency provided and the average frequency remains constant at the last value it had when the most recent instant frequency was provided.

When the system is tracking in real time, it has instantaneous frequency information coming in from the loop filter 810. This frequency information is passed from the frequency selector 920 to the frequency counter 930, which processes the frequency very precisely, e.g., using 24 bits in the preferred embodiment. The precision of the number from the frequency counter 930 will ultimately determine the resolution level by which the system can modify the local clock phase to determine and set the receiver clock phase.

But the frequency counter 930 receives different information depending upon whether it's in an acquisition/tracking mode or in a coast mode. In an acquisition/tracking mode, the system receives real-time instant frequency data, which comes through and provides change information to the current phase location, i.e., it ultimately changes the receiver clock phase. Thus, the tracking/coasting controller 920 will preferably provide the frequency counter 930 with the instant frequency as its input.

However, once the device has finished receiving a packet and enters a coast mode, there will no longer be any real-time frequency information. All that the tracking/coasting controller 920 will have as input values are the last instant frequency value received during the last track mode, and the last average frequency value received during the last track mode. Because of the inherent noise in the instant frequency number, the last instant frequency value may not be accurate. But the last average frequency value output from the averaging block 910 (a leaky integrator in the preferred embodiment) can be quite accurate, since it outputs an average value determined from the last several instant frequency values. Therefore, during coasting the tracking/coasting controller 920 will provide the frequency counter 930 with the average frequency as its input.

Since the first symbol phase/chip phase register 950 continues to have an input signal during the coast mode, it will continue to update its value. Thus, even while the device is not receiving a signal, it is updating the estimated phase of the transmitter clock from the transmitter that it most recently received a signal from.

Of course, during a coast mode it may also be necessary for the current device to transmit information. To do this, the device preferably returns to its local phase and frequency for transmitting signals. This is accomplished in the circuit of FIG. 9 through the use of the slew controller 960 and the second symbol phase/chip phase register 970.

In tracking mode, the second symbol phase/chip phase register 970 follows along mirroring the phase information in the first symbol phase/chip phase register 950. This can be done as a continual process, having the same value simultaneously entered into both registers, or it can be periodic, having the value of the first symbol phase/chip phase register 950 periodically copied into the second symbol phase/chip phase register 970.

When the device enters into the coast mode, the phase controller switches its input from the first symbol phase/chip phase register 950 to the second symbol phase/chip phase register 970 (which contains the same value currently in the first symbol phase/chip phase register 950). The slew controller 960 then slowly changes the value in the second symbol phase/chip phase register 970 until it matches the value for its fundamental clock. In this way, the transmitting clock is set to its desired phase, i.e., its base position, but in a way that will not disrupt any digital logic.

This is necessary because other devices are possibly saving information regarding the transmission phase and frequency of the current device. It is therefore necessary to return to a known phase and frequency so that other devices can perform a fast acquisition when listening to the current device. However, by using a stewing function, the return to the fundamental transmission frequency will be slow enough not to cause any trouble with associated circuitry.

In alternate embodiments the second symbol phase/chip phase register 970 need not continually or periodically mirror the first symbol phase/chip phase register 950. Rather, it can simply copy the value of the first symbol phase/chip phase register 950 at the point where the mode changes to the coast mode.

Regardless, during coast mode, the first symbol phase/chip phase register 950 preferably continues to store an estimated current phase for the former transmitting device that is based upon the average frequency output from the averaging block 910. Thus, the averaging block 910, frequency selector 920, frequency counter 930, summer 940, and first symbol phase/chip phase register 950 continually update the estimated current phase information for as long as the coast mode continues.

In the current preferred embodiment each device stores only the phase and frequency information of the device it has most recently talked to. Once the current device begins communication with a new device, it must perform a blind acquisition and start all over again.

However, in alternate embodiments phase and frequency data could be stored and tracked for multiple devices at a given time. Such monitoring could be performed at a media access control (MAC) layer in either the current device or a central device.

Preferably the estimated frequency and phase information is available to the MAC layer for the given device. As a result, this information could be used in a variety of ways. The MAC could store it in a lookup table, pass it to another device or central controller, etc.

Even during the coast phase, the frequency counter 930, summer 940, and first symbol phase/chip phase register 950 preferably continue updating the estimated phase based on the most recent averaged frequency. The device uses this average frequency to count the current estimated phase at a certain pace, increasing or decreasing the current estimated phase, as necessary. And although there is no new phase or frequency information being input, at this point the constant average frequency output from the averaging block 910 is assumed to be a close estimate of the actual frequency of the device that most recently transmitted to the current device.

In other words, based on the difference between the stored average frequency of the device that most recently transmitted to the current device and the actual frequency of the current device, the first symbol phase/chip phase register 950 will periodically increment or decrement the first chip resister 956 to account for the shifting phase of the clock of the device that most recently transmitted to the current device.

Meanwhile the phase controller 980 of the current device controls the device's transmitting clock phase based on a set base phase and frequency stored in the second symbol phase/chip phase register 970 (and set there from the slew controller).

The current device will remain in a coast mode until it needs to receive a new packet from another device (which may or may not be the same device it most recently received from. At this point, generally the start of another frame, the current device (acting as a receiving device again) will perform a new acquisition. If the transmitting device is the same device that was most recently a received from, then the acquisition is preferably a fast acquisition process. If, however, it is a different device, then the acquisition is preferably a blind acquisition. In either case, the current device will need to move the phase of its local clock into the position stored in the first symbol phase/chip phase register 950.

However, as when it entered the coast mode, it is necessary for the device to be gentle with this phase change. Since the clock in each device controls digital logic elements, it's not good to move the clock rapidly from one phase to another. This is because the digital logic cannot adjust to such rapid changes. As a result, the system must slew the receiving clock slowly in one direction or another.

Thus, just as the slew controller 960 gently moves the clock phase back to the fundamental transmitting phase when the device enters a coast mode, it also slowly moves the clock phase back to the phase estimate stored in the first symbol phase/chip phase register 950 when the device enters a new acquisition mode.

The slew controller will preferably slowly adjust the phase in the second symbol phase/chip phase register 970 at a rate that will not disturb the digital logic, until it reaches the value currently stored in the first symbol phase/chip phase register 950. This can be done by either incrementing or decrementing the value in the second symbol phase/chip phase register 970, as appropriate.

Once the values in the second symbol phase/chip phase register 970 and first symbol phase/chip phase register 950 are the same, the phase controller 980 will preferably switch its input from the second symbol phase/chip phase register 970 to the first symbol phase/chip phase register 950, and start adjusting the phase of the receiving clock based on the estimated phase stored in the first symbol phase/chip phase register 950.

The slew controller 960 preferably has as inputs the values in the first symbol phase/chip phase register 950 and the second symbol phase/chip phase register 970, and includes information regarding the base value for the second symbol phase/chip phase register 970 that corresponds to the fundamental phase of the transmitting clock. This allows the slew controller 960 to adjust the value stored in the second symbol phase/chip phase register 970 when entering or leaving a coast mode.

When entering the coast mode the slew controller 960 will slowly adjust the value stored in the second symbol phase/chip phase register 970 from the value stored in the first symbol phase/chip phase register 950 to the base value (corresponding to the device's fundamental transmitting phase). When leaving the coast mode, the slew controller 960 will slowly adjust the value stored in the second symbol phase/chip phase register 970 from the base value to the value stored in the first symbol phase/chip phase register 950.

The base value (corresponding to the device's fundamental transmitting phase) is zero (i.e., corresponding to the device's base phase without any change) in the preferred embodiment, but may vary in alternate embodiments.

The slew controller 960 will also preferably receive a control signal (not shown) that indicates when the system switches modes, i.e., going from tracking to coasting or vice versa.

Figure 11:
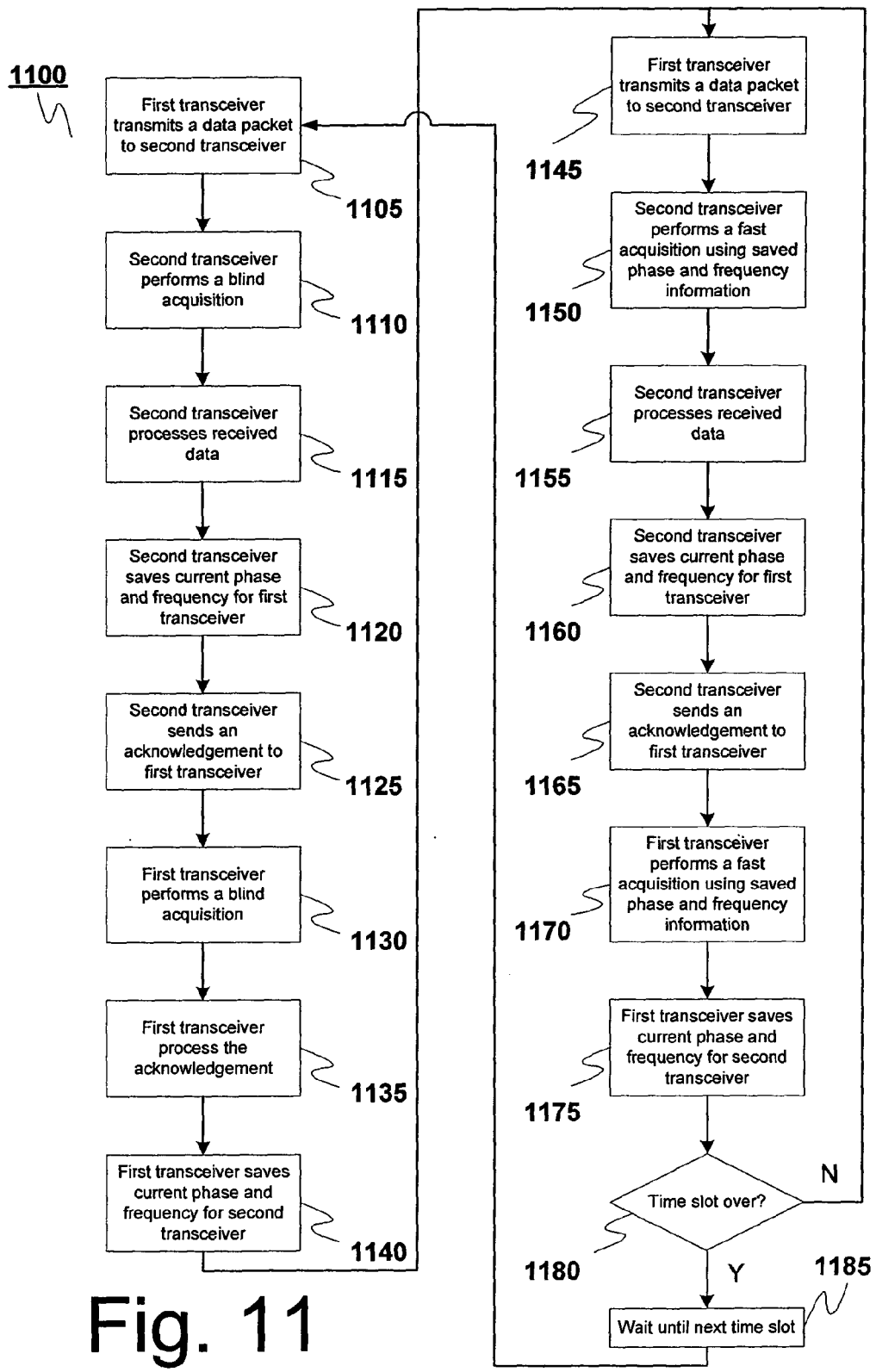
FIG. 11 is a flow chart describing a method of fast acquisition between the devices of FIG. 4, according to a preferred embodiment of the present invention.

FIG. 11 is a flow chart describing a method of fast acquisition between the devices of FIG. 4, according to a preferred embodiment of the present invention. As shown in FIG. 11, a first transceiver 410 begins by transmitting a data packet to a second transceiver 420. (Step 1105) The second transceiver 420 then performs a blind acquisition to acquire the signal from the first transceiver 410 (Step 1110), processes the data that it's receiving (Step 1115) and then saves the current phase and frequency information for the first transceiver 410 (obtained during acquisition) in memory. (Step 1120)

The second transceiver 420 can then transmit a data packet to the first transceiver 410. (Step 1125) Although in the preferred embodiment this data packet is an acknowledgement, in alternate embodiments it could be a standard data packet, a combination of a standard data packet and an acknowledgement, or some other set of data.

The first transceiver 410 must then perform a blind acquisition on the signal from the second transceiver 420 (Step 1130), process the data/acknowledgement (Step 1135), and then save the current phase and frequency information for the second transceiver 420 (obtained during acquisition) in memory. (Step 1140) At this point both the first and second transceivers 410 and 420 have stored current information regarding the phase and frequency of the other transceiver.

The first transceiver 410 then transmits another data packet to the second transceiver 420. (Step 1145) The second transceiver can now perform a fast acquisition based on its stored phase and frequency data for the first transceiver 410. (Step 1150) This fast acquisition may use the actual stored phase or may modify the stored phase based on the stored frequency and the elapsed time since it was stored.

During this operation, the second transceiver 420 processes the new data packet sent from the first transceiver 410 (Step 1155) and updates the stored phase and frequency information for the first transceiver, (Step 1160) which can then be used for later fast acquisition steps.

The second transceiver 420 then sends another data packet back to the first transceiver 410. (Step 1165) As before, this can be a standard data packet, an acknowledgement, a combination of a standard data packet and an acknowledgement, or some other set of data.

Because it has stored information on the phase and frequency of the second transceiver, the first transceiver 410 can also perform a fast acquisition using that stored information. (Step 1170) The first transceiver 410 then processes the new data (Step 1175) and updates the stored frequency and phase data for the second transceiver 420. (Step 1180)

At this point the system determines if the time slot is over. (Step 1185) If not, the first and second transceivers 410 and 420 continue successive fast acquisition steps as above (Steps 1145–1175), for the duration of the time slot. Once the system determines that the time slot is over (in Step 1180), it waits until the next time slot (Step 1185) and begins blind acquisition again (Step 1105).

In alternate embodiments there need not necessarily be a one-to-one correspondence of data packets being sent between transceivers. For example, one transceiver may send repeated data packets with the other only sending an acknowledgement after a certain number have been received. What is important is that during a time slot whenever transceiver does not have valid phase and frequency data it must first perform a blind acquisition to obtain that data. Once a transceiver has stored such data, it can switch to fast acquisition for later data packets.

In the embodiment described with respect to FIG. 4, each transceiver stores data for a single transceiver pair. In this instance it stores the data of the most recent transceiver it spoke with, though this could be data for another transceiver, e.g., a transceiver that frequently sends data packets. Alternate embodiments could allow each transceiver to store a table with phase and frequency information for each other transceiver in the system. Alternatively, a central controller could store a table with phase and frequency information for each transceiver pair, while each individual transceiver would store the phase and frequency information for the central controller. When assigning time slots, the central controller could then pass on the relevant phase and frequency data.

In each embodiment it is preferable that the relevant storage unit (transceiver, central controller, etc.) continually update phase and frequency estimates as they receive information. Thus, even after a transceiver acquires an incoming data packet, it preferably continues to update phase and frequency estimates during a tracking stage.

In addition, it is preferable that the relevant storage unit (transceiver, central controller, etc.) update phase and frequency estimates after the passage of time during which no signal was received. In this case, there is no way to obtain data on frequency or phase, so the device can update the phase estimate based on the stored frequency value and the duration of time elapsed. This can be done continually, periodically, or as needed to receive a transmission. Thus, the system predicts future phase, based on current phase and current frequency estimates.

The frequency used for this estimate can be determined in a number of ways: it could be a value that was averaged; it could be something programmed into memory; it could be an actual measurement; etc.

Although the preferred embodiment describes a situation where a first transceiver (first device) transmits data packets to a second transceiver (second device), and the second transceiver sends acknowledgement packets back to the first transceiver, this can be varied in alternate embodiments. Both transceivers could send data packets; both could send acknowledgement packets, or any combination. The methods and apparatuses described above can be used in any situation where two devices are communicating with each other.

Figure 12:
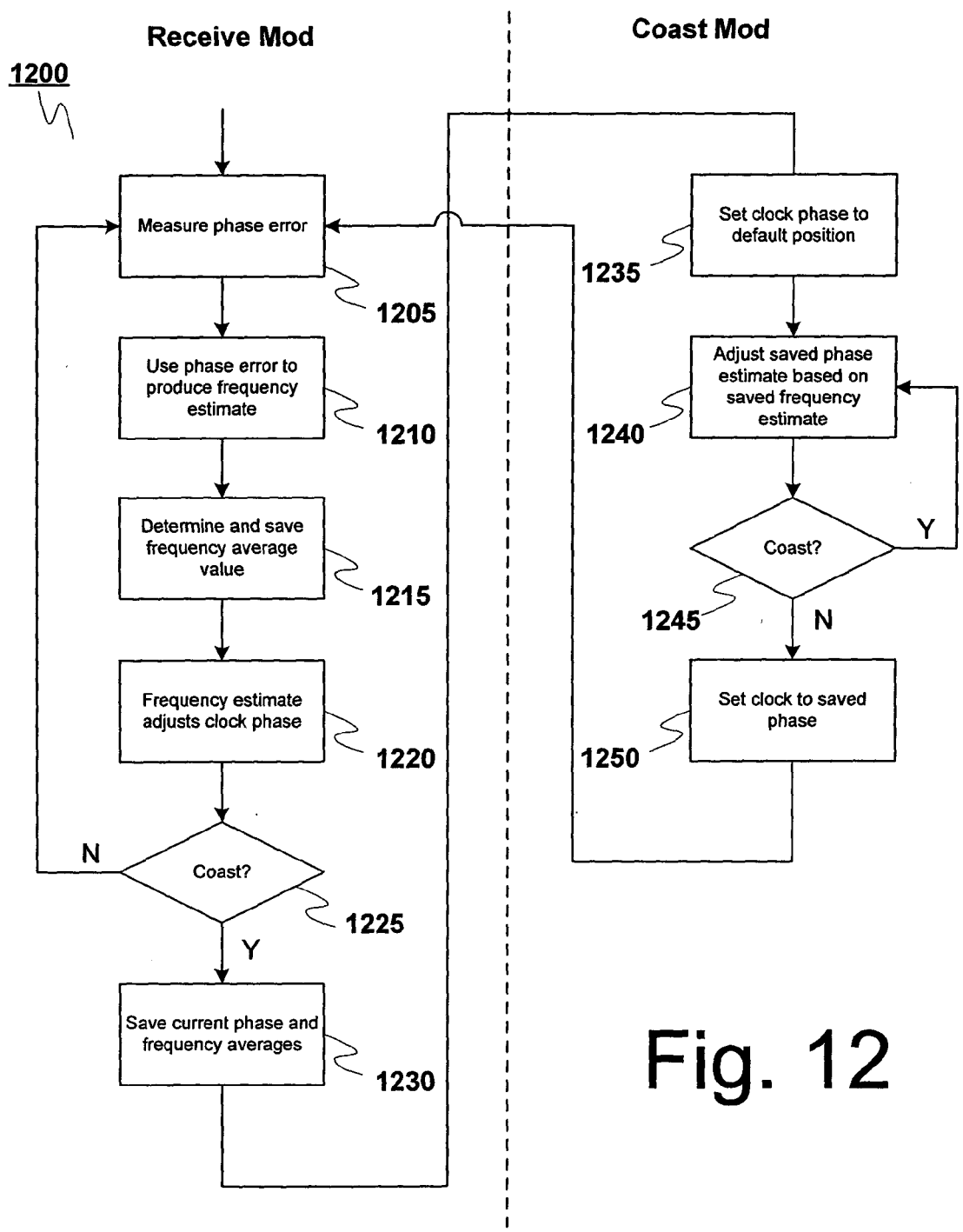
FIG. 12 is a block diagram showing a method for adjusting and maintaining a frequency estimate in fast acquisition circuitry, according to a preferred embodiment of the present invention.

FIG. 12 is a block diagram showing a method for adjusting and maintaining a frequency estimate in fast acquisition circuitry, according to a preferred embodiment of the present invention.

As shown in FIG. 12, after a device acquires a signal it enters a tracking mode in which it measures the phase error of the signal. (Step 1205). Based on this measurement of phase error, the device produces a frequency estimate in real time. (Step 1210).

The device then determines and saves an average value of the frequency based on the instant frequency and the values of the instant frequency over a set period of time. (Step 1215) This may be accomplished through a simple average of values, a leaky integrator, etc. Different types of averaging circuits can be chosen as desired, although the preferred embodiment uses a leaky integrator filter for averaging. The number of values to be averaged will depend upon the level of accuracy that is desired and the level of complexity that is acceptable.

The device then uses the real-time frequency estimate to directly adjust the phase of its receiving clock. (Step 1220) In various embodiments, the clock phase may be adjusted based on either the actual instant frequency estimate or the updated average frequency estimate.

After adjusting its receiving clock phase, the device then determines if it is finished receiving the signal or if it is ready to coast. (Step 1225)

In an alternate embodiment, the step of determining and saving the frequency average value (Step 1215) can be performed only after Step 1225 determines that the device must enter a coast mode. In this embodiment, the device does not need to produce an average value every clock cycle, but only needs to do it once when the device enters into a coast mode. Other alternate embodiments can determine and save the frequency average value at some periodic time less often than every clock phase, but more often than once at the end of the tracking mode.

If the device is not finished receiving the incoming signal, i.e., it is not ready to coast, it will again measure phase error (Step 1205) and will continue with the process a above.

If, however, the device is finished receiving the incoming signal, i.e., it is ready to coast, it will save its current phase and frequency estimates (Step 1230) and will proceed to a coast mode.

In the coast mode, the device will reset its clock phase and frequency to a default position. (Step 1235) This is done so that the device will transmit at the same phase each time it transmits. In the preferred embodiment this reset function is performed any time the device enters a coast mode. In alternate embodiments it could be done only when the device needs to transmit a signal.

However, the device will also continue to adjust the saved phase estimate based on the saved frequency estimate. (Step 1240) This is done so that the device can continue to maintain a valid estimate of the phase of the clock of the other device that the current device was last in communication with.

After updating the phase estimate, the device will then determine whether it will stay in coast mode, i.e., whether it is ready to receive a new signal. (Step 1245) If it remains in coast mode, the device will repeatedly update the phase estimate (Step 1240) for as long as the device remains in the coast mode.

Once the device leaves coast mode, i.e., it is ready to receive the signal again, the device sets its clock phase to the saved phase. (Step 1250) This number has been continually updated during coast mode, so it should provide a good estimate of the current phase of the incoming signal. (Note: this assumes that the current device is still receiving from the same other device it was previously.)

Once the device has set its clock phase to the saved phase, it reenters the receive mode by again starting to measure the phase error of the incoming signal (Step 1205) and will continue with the process from there As noted above, the frequency estimate used to modify the phase of the receiving clock during the receive (or track) mode may be a real time, instantaneous estimate, or it could be an average-type frequency estimate.

Regarding the transmission clock position it's preferable for each device to default back to a fixed point before coasting (or before transmitting if the device does not alter its transmission clock during the entire coast mode). This establishes a fixed reference point for other devices that may be listening to the current device.

It's also preferable that, as each device moves its receiving clock around, i.e., as it receives a signal, or in between coasting and receiving, it make its changes very gently, using a mechanism that doesn't cause any violations of timing in digital electronics.

Lastly, all of these things are used in order to vary accuracy of the estimate during coasting, it is possible to adjust hardware resolution, filter and filter coefficients, as well as the signal processing methods used to modify these values.

Alternate Frequency Maintaining Circuit

Figure 13:
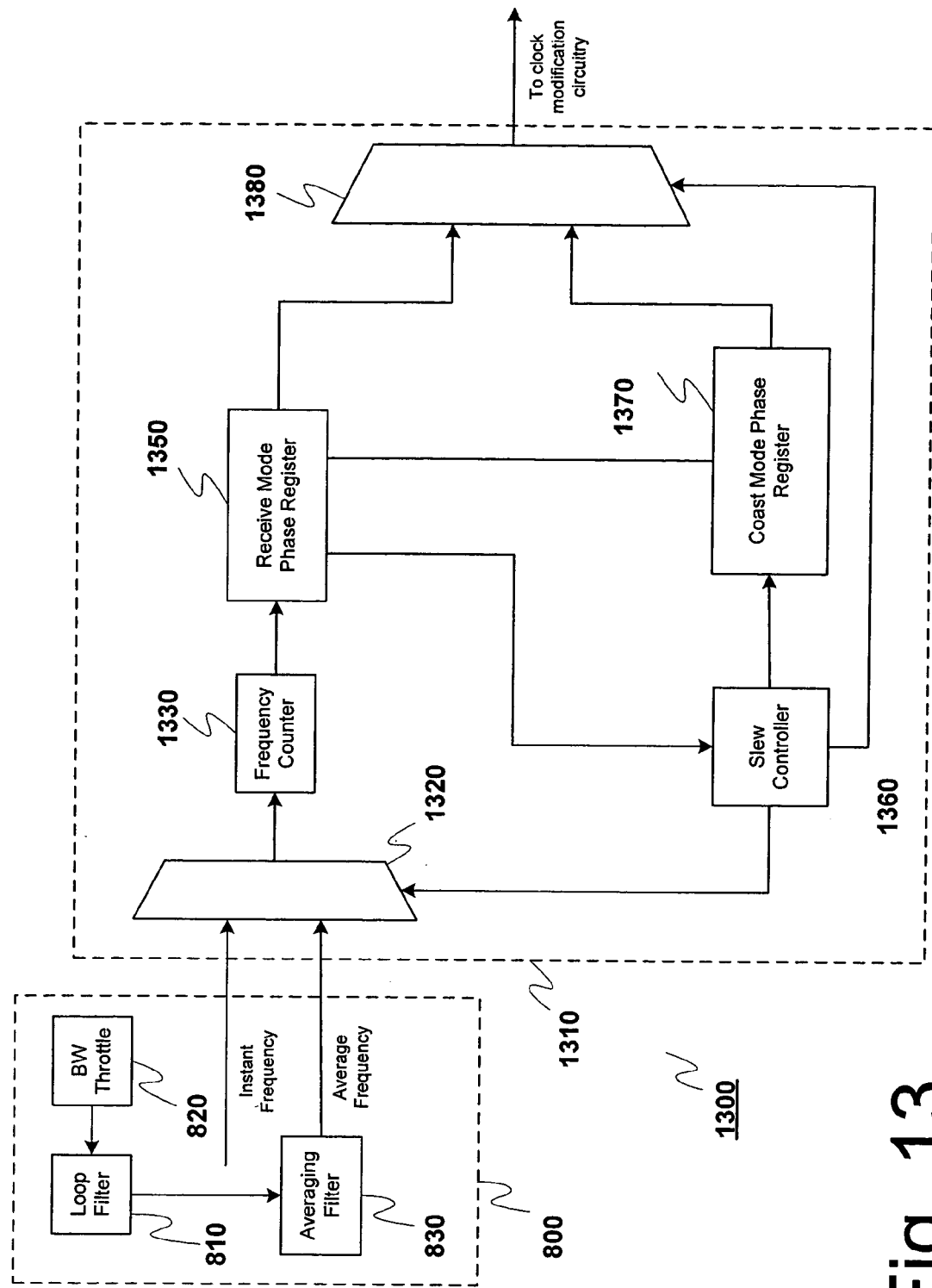
FIG. 13 is a block diagram of an alternate embodiment of a frequency maintaining circuit, according to a preferred embodiment of the present invention.

FIG. 13 is a block diagram of an alternate embodiment of a frequency maintaining circuit, according to a preferred embodiment of the present invention. As shown in FIG. 13, the frequency maintaining circuit includes an averaging block 1310, a frequency selector 1320, a frequency counter 1340, a receive mode phase register 1350, a slew controller 1360, a coast mode phase register 1370, and a phase controller 1380.

The averaging block 1310 receives a series of instant frequency values from the loop filter 810 and performs an averaging function on them, producing an average frequency value. The frequency selector 1320 comprises a multiplexer that chooses between the instant frequency values and the average frequency value. The frequency counter 1330 determines the frequency value passed to it by the frequency selector to a high degree of precision. The receive mode phase register 1350 comprises a resister or registers that store the chip phase and the symbol phase. The slew controller 1360 controls the value in the coast mode phase register 1370. The coast mode phase register 1370 comprises resister or registers that store the chip phase and the symbol phase. The phase controller 1380 comprises a multiplexer that chooses between the output of the receive mode phase register 1350 and the coast mode phase register 1370.

During a receive mode (i.e., an acquisition/tracking mode), the frequency maintaining circuit 1300 receives an instantaneous frequency estimate from an appropriate filter or filters. This instant frequency estimate is passed through the frequency selector 1320 and is used to control the frequency counter 1330. The frequency counter 1330 will use the instant frequency estimate to update a phase stored in the receive mode phase register 1350.

At the same time, the averaging block 1310 will perform an averaging function on the instant frequency coming in, averaging some number of sequential instant frequencies to obtain an average frequency. During the receive mode this average frequency is preferably continually updated.

In alternate embodiments the updated average frequency could be used rather than the instant frequency to control the frequency counter 1330. However, regardless of which frequency measurement the frequency counter 1330 receives, during the receive mode, that frequency measurement will be continually or periodically updated based on the received signal.

During a receive mode, the phase stored in the receive mode phase register 1350 is passed through the phase controller 1380 and is used to adjust the clock phase of the receiving clock in the device.

When the device first enters into a coast mode, it performs a number of tasks. First, it latches the current phase information from the receive mode phase register 1350 into the coast mode phase register 1370. Then the phase controller 1380 switches from passing the phase information in the receive mode phase register 1350 to control the device's clock phase to passing the phase information in the coast mode phase register 1370 to control the device's clock phase.

Because during the coast mode there is no longer an incoming signal, neither the averaging block 1310 nor the frequency selector 1320 receive an updated instant frequency. As a result, the averaging block 1310 continues to output the last average frequency it had calculated, maintaining this as an estimated frequency of the former incoming signal. The frequency selector 1320 switches its input to this constant average frequency, passing that value to the frequency counter 1330 to be used to update the value in the receive mode phase register 1350.

Thus, even though during the coast mode the phase controller 1380 does not use the value stored in the receive mode phase register 1350, the averaging block 1310, the frequency selector 1320, the frequency counter 1330, and the receive mode phase register 1350 continue to operate to update the phase stored in the receive mode phase register 1350 based on its estimated frequency, i.e., the last average frequency value.

Alternate embodiments could use the last instant frequency value instead of the averaged frequency as an input for the frequency selector 1320, although this instant frequency would be less accurate because of the noise in the incoming signal. If the instant frequency value were used during the receive mode and the last known instant frequency were used in the coast mode, the averaging block 1310 could be replaced by a simple register.

In the alternative, the averaged frequency could be used during both the coast and receive modes. In this case, the frequency selector 1320 could be removed altogether, and the output of the averaging block 1310 connected directly to the input of the frequency counter 1330.

Once the current phase is stored in the coast mode phase register 1370, the slew controller 1360 slowly adjusts the phase information stored in the coast mode phase register 1370 until it reaches a set of default phase information, i.e., the base phase of the device's clock. This adjustment is preferably performed at a speed slow enough so that it does not disrupt the operation of digital logic.

When the device moves back from the coast mode to the receive mode (i.e., for a new signal acquisition), the slew controller 1360 also serves to keep the phase change at a desired rate. In this case the slew controller 1360 slowly adjusts the value in the coast mode phase register 1370 until it is identical with the value in the receive mode phase register 1350. Then the phase controller 1380 switches its input from the coast mode phase register 1370 to the receive mode phase register 1350.

Although in this embodiment the frequency selector 1320 is controlled by the slew controller 1360, this need not be the case. The frequency selector 1320 can receive its control from anywhere else that can provide it with a signal that indicates whether the device is in receive mode or coast mode.

The resolution of the frequency counter 1330 determines the fundamental bare minimum frequency increments, and thus the size of the receive mode phase register 1350 and the coast mode phase register 1370. The receive mode phase register 1350 and the coast mode phase register 1370 can take a number of different forms. It can house a the chip phase, a combination of the chip phase and the symbol phase, or an absolute symbol phase.

CONCLUSION

Obviously, numerous modifications and variations of the present invention are possible in light of the above teachings. It is therefore to be understood that within the scope of the appended claims, the invention may be practiced otherwise than as specifically described herein.

We claim:

1. A method of fast acquisition in a wireless network, comprising:
   receiving a first wireless signal at a receiving device, the first wireless signal being sent from a transmitting device;
   determining a first transmitting clock phase of the transmitting device by performing first acquisition and tracking processes on the first wireless signal;
   storing the first transmitting clock phase in the receiving device;
   receiving a second wireless signal at the receiving device, the second wireless signal being sent from the transmitting device after the first wireless signal;
   determining a second transmitting clock phase of the transmitting device by performing a second acquisition process on the second wireless signal,
   wherein the step of determining the first transmitting clock phase includes
      determining the first transmitting clock phase of the transmitting device by performing the first acquisition process; and
      updating the first transmitting clock phase of the transmitting device by performing the first tracking process, and
   wherein the step of storing the first transmitting clock phase stores the updated first transmitting clock phase at the end of the first tracking process, and
   wherein the second acquisition process is performed using the first transmitting clock phase as starting phase data.

2. A method of fast acquisition in a wireless network, as recited in claim 1,
   wherein the step of determining the first transmitting clock phase includes determining how a receiving clock phase must be altered to match the first transmitting clock phase, and
   wherein the step of determining the second transmitting clock phase includes determining how the receiving clock phase must be altered to match the second transmitting clock phase.

3. A method of fast acquisition in a wireless network, as recited in claim 1, wherein the step of updating the first transmitting clock phase further comprises:
   measuring the frequency of the first wireless signal; and
   adjusting the first transmitting clock phase based on a difference between the frequency of the first wireless signal and a frequency of a local receiver clock.

4. A method of fast acquisition in a wireless network, as recited in claim 3, further comprising:
   determining a frequency average value of the first wireless signal when the first tracking process ends; and
   storing the frequency average value.

5. A method of fast acquisition in a wireless network, as recited in claim 4, further comprising updating the first transmitting clock phase during a coast period between when the first tracking process ends and the second acquisition process begins.

6. A method of fast acquisition in a wireless network, as recited in claim 5, wherein the step of updating the first transmitting clock further comprises adjusting the stored first transmitting clock phase based on a difference between the frequency average value and a frequency of a local receiver clock.

7. A method of fast acquisition in a wireless network, as recited in claim 1, wherein to first acquisition process is a blind acquisition process.

8. A method of fast acquisition in a wireless network, as recited in claim 1, wherein the first and second wireless signals are ultrawide bandwidth signals.

9. A method of fast acquisition in a wireless network, comprising:
   receiving a first wireless signal at a receiving device, the first wireless signal being sent from a transmitting device;
   determining a first transmitting clock phase of the transmitting device by performing first acquisition and tracking processes on the first wireless signal;
   storing the first transmitting clock phase in the receiving device;
   receiving a second wireless signal at the receiving device, the second wireless signal being sent from the transmitting device after the first wireless signal;
   determining a second transmitting clock phase of the transmitting device by performing a second acquisition process on the second wireless signal; and
   updating the stored first transmitting clock phase during a coast period between when the first tracking process ends and the second acquisition process begins, wherein the second acquisition process is performed using the first transmitting clock phase as starting phase data.

10. A method of fast acquisition in a wireless network, as recited in claim 9,
wherein the step of determining the first transmitting clock phase includes determining how a receiving clock phase must be altered to match the first transmitting clock phase, and
wherein the step of determining the second transmitting clock phase includes determining how the receiving clock phase must be altered to match the second transmitting clock phase.

11. A method of fast acquisition in a wireless network, as recited in claim 9, wherein the step of updating the first transmitting clock phase further comprises:
measuring the frequency of the first wireless signal; and
adjusting the first transmitting clock phase based on a difference between the frequency of the first wireless signal and a frequency of a local receiver clock.

12. A method of fast acquisition in a wireless network, as recited in claim 11, further comprising:
determining a frequency average value of the first wireless signal when the first tracking process ends; and
storing the frequency average value.

13. A method of fast acquisition in a wireless network, as recited in claim 12, wherein the step of updating the first transmitting clock further comprises adjusting the stored first transmitting clock phase based on a difference between the frequency average value and a frequency of a local receiver clock.

14. A method of fast acquisition in a wireless network, as recited in claim 9, wherein the first acquisition process is a blind acquisition process.

15. A method of fast acquisition in a wireless network, as recited in claim 9, wherein the first and second wireless signals are ultrawide bandwidth signals.

16. An acquisition circuit for fast acquisition of an incoming wireless signal, comprising:
a frequency estimator for repeatedly generating a frequency estimate for the incoming wireless signal during an acquisition/track mode;
a first phase estimator for repeatedly generating a first phase estimate during the acquisition/track mode based on a first starting phase and the frequency estimate;
a second phase estimator for repeatedly generating a second phase estimate during a coast mode based on a second starting phase and an adjustment frequency;
a selection circuit for selecting one of the first phase estimate and the second phase estimate.

17. An acquisition circuit for fast acquisition of an incoming wireless signal, as recited in claim 16,
wherein the second starting phase is a value of the first phase estimate when the acquisition circuit enters the coast mode, and
wherein the adjustment phase is a value of the frequency estimate when the acquisition circuit enters the coast mode.

18. An acquisition circuit for fast acquisition of an incoming wireless signal, as recited in claim 16, wherein the frequency estimate for the incoming wireless signal includes an instant frequency estimate that is determined based on the incoming wireless signal, and an avenge frequency estimate that is determined based on the incoming wireless signal and one or more prior values of the instant frequency estimate.

19. An acquisition circuit for fast acquisition of an incoming wireless signal, as recited in claim 18,
wherein the second starting phase is a value of the first phase estimate when the acquisition circuit enters the coast mode, and
wherein the adjustment phase is a value of the average frequency estimate when the acquisition circuit enters the coast mode.

20. An acquisition circuit for fast acquisition of an incoming wireless signal, as recited in claim 16,
wherein the first phase estimate includes a first symbol phase estimate and a first chip phase estimate, and
wherein the second phase estimate includes a second symbol phase estimate and a second chip phase estimate.

* * * * *

UNITED STATES PATENT AND TRADEMARK OFFICE
CERTIFICATE OF CORRECTION

| | | |
|---|---|---|
| PATENT NO. | : 7,212,799 B2 | Page 1 of 1 |
| APPLICATION NO. | : 10/654922 | |
| DATED | : September 5, 2003 | |
| INVENTOR(S) | : Timothy R. Miller | |

It is certified that error appears in the above-identified patent and that said Letters Patent is hereby corrected as shown below:

In Column 28, Line 43, Claim No. 7:

Change "recited in claim 1, wherein to first" to --recited in claim 1, wherein the first--

Signed and Sealed this

Twenty-ninth Day of July, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,212,799 B2 | Page 1 of 1 |
| APPLICATION NO. | : 10/654922 | |
| DATED | : May 1, 2007 | |
| INVENTOR(S) | : Timothy R. Miller | |

It is certified that error appears in the above-identified patent and that said Letters Patent is hereby corrected as shown below:

In Column 28, Line 43, Claim No. 7:

Change "recited in claim 1, wherein to first" to --recited in claim 1, wherein the first--

This certificate supersedes the Certificate of Correction issued July 29, 2008.

Signed and Sealed this

Twenty-sixth Day of August, 2008

JON W. DUDAS
*Director of the United States Patent and Trademark Office*